United States Patent
Uehara et al.

(10) Patent No.: US 6,611,269 B1
(45) Date of Patent: Aug. 26, 2003

(54) VIDEO DISPLAY UNIT AND PROGRAM RECORDING MEDIUM

(75) Inventors: Hirotoshi Uehara, Hirakata (JP); Naoki Kurita, Osaka (JP); Shoichi Goto, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,319

(22) PCT Filed: Jun. 10, 1999

(86) PCT No.: PCT/JP99/03116

§ 371 (c)(1), (2), (4) Date: May 5, 2000

(87) PCT Pub. No.: WO99/65236

PCT Pub. Date: Dec. 16, 1999

(30) Foreign Application Priority Data

Jun. 11, 1998 (JP) .......................... 10-163143
Dec. 8, 1998 (JP) .......................... 10-349111

(51) Int. Cl.[7] .............................. G06T 15/00
(52) U.S. Cl. ............... 345/522; 345/501; 345/719; 345/723
(58) Field of Search .................. 345/501, 522, 345/530, 531, 545, 547, 719, 723

(56) References Cited

U.S. PATENT DOCUMENTS 4,800,430 A * 1/1989 Murakami et al. .......... 348/721
5,694,585 A * 12/1997 Dwin et al. .................. 345/521
5,764,311 A * 6/1998 Bonde et al. ................ 348/746
5,982,459 A * 11/1999 Fandrianto et al. ...... 348/845.2

FOREIGN PATENT DOCUMENTS

| JP | 60-180382 | 9/1985 |
| JP | 04-068888 | 3/1992 |
| JP | 06-245195 | 9/1994 |
| JP | 07-007723 | 1/1995 |
| JP | 09-114443 | 5/1997 |
| JP | 10-126748 | 5/1998 |
| JP | 10-198302 | 7/1998 |
| JP | 10-336544 | 12/1998 |

* cited by examiner

Primary Examiner—Matthew C. Bella
Assistant Examiner—Mackly Monestime
(74) Attorney, Agent, or Firm—Smith, Gambrell & Russell, LLP

(57) ABSTRACT

A video display unit according to the present invention is provided with a multipurpose arithmetic unit for generating display data by carrying out at least one operation within one period of the pixel clock and an instruction sequencer for describing as instructions the display data and the operational contents to be inputted to this, and by implementing the described instructions while synchronizing to the display clock, picture up/down scaling processes as well as a blending process with the OSD are realized. Thereby, it is not necessary to provide a dedicated circuit for each of required specifications such as in a conventional unit, and by rewriting instructions within the instruction sequencer, it is possible to cope with a plurality of display specifications.

11 Claims, 17 Drawing Sheets

| input picture | | display video (horizontal up-scaled ratio) | |
|---|---|---|---|
| resolution (horizontal × vertical) | aspect ratio | 16:9 monitor | 4:3 monitor |
| 720×480 | 16:9 | X1 | PSW×4/3 |
| | 4:3 | X3/4 | X1 |
| 544×480 | 16:9 | X4/3 | PSW×16/9 |
| | 4:3 | X1 | X4/3 |
| 480×480 | 16:9 | X3/2 | PSW×2 |
| | 4:3 | X9/8 | X3/2 |
| 352×480 | 16:9 | X2 | PSW×8/3 |
| | 4:3 | X3/2 | X2 |
| 352×240 | 16:9 | X2 | PSW×8/3 |
| | 4:3 | X3/2 | X2 |

※PSW:Pan&Scan Window

DVB video output format pan-scan display

VIDEO DISPLAY UNIT AND PROGRAM RECORDING MEDIUM

FIELD OF THE INVENTION

This invention relates to a video display unit including a set top box for receiving digital broadcasting signals which multiplex digital data such as compressed video signals or program information and for decoding and outputting the selected video signals. This invention also relates to a program recording medium.

BACKGROUND OF TECHNOLOGY

In accordance with the recent development of the digital technology, digital broadcasting services have been realized which use videos, audio, and data signals for broadcasting as digital signals in a unified way, and broadcast them by utilizing a satellite or the like.

In those services to provide tens or hundreds of channels of broadcasting by means of a compression multiplex technology represented by MPEG2 (standardized with ISO/IEC-13818) or the like. Each broadcasting service provider intends to complete a variety of services for implementing high definition video broadcasting and for realizing the differentiation such as an information service using still picture or the like by utilizing the characteristics of the digital broadcasting where all the signals for videos, audio, and data or the like are handled as digital signals, and a video display unit is required to cope with those.

An example of a conventional MPEG video decoder system is shown in FIG. 14, which will be described in operation in the following.

In FIG. 14, the numeral 100 denotes a system control means for controlling the entire system, the numeral 101 denotes a video decoding means for decoding MPEG, the numeral 102 denotes a frame memory for storing display data, and the video decoding means 101 stores video data to be decoded and graphics data of on-screen display (hereinafter referred to as OSD). The numeral 103 denotes a display timing generation means for generating a synchronizing signal or the like, the numeral 104 is a memory control means for controlling reading or writing of the frame memory 102. The numeral 105 denotes an output buffer means for temporarily storing the display data read by the memory control means 104. The numeral 800 denotes a video processing unit for generating display data by using the data of the output buffer means 105, and the numeral 801 denotes a control timing generation means for controlling the video processing unit 800.

FIG. 15 illustrates an exemplary internal configuration of the video processing unit 800 in the above mentioned MPEG video decoder system. The numerals 8001 and 8002 denote horizontal filter circuits for horizontal up/down scaling operations of the video data, the numeral 8003 denotes a vertical filter circuit for up/down scaling in the vertical direction the sequential two line data from the horizontal filters 8001 and 8002, and the numeral 8004 denotes a blending circuit for switching between video data from the vertical filter circuit 8003 and the OSD data.

FIG. 16(a) shows a video output format to be implemented at a receiver for digital broadcasting established by the DVB (Digital Video Broadcasting DOCUMENT A001-revision 1) standard.

In order to implement the horizontal and vertical up-scaling processing shown in FIG. 16(a), the horizontal filter circuit 8001 and 8002 as well as the vertical filter circuit 8003 are provided with circuits in advance corresponding to the following magnifications.

horizontal filter circuits: 3/4, 1, 9/8, 4/3, 3/2, 2, 8/3
vertical filter circuits: 1, 2

FIG. 16(b) shows a pan-scanning process, which cuts out and expands horizontally the central display portion (Pan & Scan Window) in case an input video with an aspect ratio 16:9 is outputted on a monitor with 4:3.

In this way, in a video display unit for a digital broadcasting receiver, the horizontal and vertical up-scaling processing of the video signals has become an indispensable function.

The MPEG decoder system in FIG. 14 is described in operation in the following.

The system control means 100 inputs a bit stream corresponding to a channel the user has selected into the video decoding means 101.

The video decoding means 101 picks out information for the input resolution of FIG. 16(a) in the bit stream to be transferred to the system control means 100. The video decoding means 101 performs the MPEG video decode processing by using the frame memory 102 as a reference frame buffer and a display frame buffer. A description for the MPEG decode processing is omitted in the detailed operation, since it doesn't directly relates to the purpose of the present invention.

The system control means 100 draws the on-screen display (OSD) data for the frame memory 102 in parallel with the decode control. This is program table data called operational information of the menu or the like or the EPG (Electronic Program Guide). In the video display, the system control means 100 controls the memory control means 104 to read out the video data decoded from the frame memory 102 and the OSD data per line unit. The data read out per line unit is temporarily stored in the output buffer means 105.

The system control means 100, in compliance with the resolution information of the input video picked out of the video decoding means 101 and the aspect ratio of the output monitor indicated in advance by the user, sets the up-scaled ratio of the horizontal filter circuits 8001 and 8002 as well as the vertical filter circuit 8003 in the video processing unit 800 so as to control the up-scaling processing shown in the FIG. 16(a). The decode video processed for up-scaling is outputted externally after blended with the OSD data at the blending circuit 8004.

In this way, the conventional video processing unit in the MPEG decoder system is provided with a dedicated circuit corresponding to the up-scaled ratio set in advance and a blending circuit with the OSD data, to generate a display output complying to the resolution information or the like of the decode video.

FIG. 17 shows a block diagram of the MPEG decoder system for implementing a still picture display in addition to an video and an OSD displays in order to correspond to a still picture information service. The video processing unit 800 is provided with two system horizontal filter circuits 8001 and 8002 as well as a vertical filter circuit 8003 to control for video data and still picture data respectively and is further provided with a blending circuit (1) 8005 for switching between the video data and the still picture data.

In operation, the system control means 100 draws not only the OSD data but also the still picture data for the frame memory 102. The still picture data are sent by utilizing data broadcasting such as digital satellite broadcasting, or are sent through the telephone line. In any case, the data are obtained by the operation of the user and displayed by the control of the system control means 100. The still picture data written in the frame memory 102 are read out to the output buffer means 105 per line unit together with the video data and the OSD data by the memory control means 104. At this time, in case the vertical filter processing is performed for the video data, sequential two lines of data are read out for the video data.

Using those data, down-scaling processing is carried out independently for the video and the still picture data by the video processing unit 800 shown in FIG. 17, and by blending the result of this operation with the OSD data, an output video as shown in FIG. 17 can be gained.

As described above, the conventional video display unit is implemented by having a dedicated circuit as shown in FIGS. 15 and 17 corresponding to a different display specification depending on each service provider. Those are usually built in as part of the MPEG video decoder LSI circuit.

On the other hand, the digital broadcasting standards for the ground wave in the U.S.A. correspond to as much as high definition system with three kinds of numbers of scanning lines 1080, 720 and 480 and with two kinds of scanning systems, the progressive scanning and the interlaced scanning, which makes it possible to have broadcasting with 18 types of video formats by combining those. To output those on a TV monitor, a scaling processing other than that shown in FIG. 16(*a*) is necessary. And an EPG display or the like by the above mentioned still picture service or the down-scaling video are expected to be required to cope with more filter operations as a video display unit.

In this way, a conventional video display unit, however, requires a different dedicated circuit depending on a service provider, and in order to correspond to a plurality of broadcasting services, there are problems such that the total circuit is increased because of the necessity of different circuits to have the individual display requirements, or the development cost is increased for the need of developing different types of LSI for the optimization depending on the services.

There also is a problem with expanding the system because there is no other method than building in a necessary circuit in advance in order to deal with processing required in future.

DISCLOSURE OF THE INVENTION

Taking those problems with the conventional video display unit into consideration, it is a purpose of the present invention to provide a video display unit to be able to limit the increase of development cost compared to the prior art.

Taking those problems with a conventional video display unit into consideration, it is also a purpose of the present invention to provide a video display unit to be able to limit the increase of the development cost compared to a prior art, and to have a better flexibility for the future expansion of the system.

A 1st invention of the present invention is a video display unit characterized by comprising:

a frame memory storing display data;

a display timing generation means for generating a display timing;

a memory control means for reading out display data from said frame memory by synchronizing to said display timing generation means;

an output buffer means for temporarily storing display data read out by said memory control means;

an arithmetic unit for generating display data by carrying out at least one operation within one period of pixel clock;

a data selection means for reading out display data from said output buffer means by synchronizing to the pixel clock and for selecting data inputted to said arithmetic unit; and an instruction sequencer for controlling said data selection means and said arithmetic unit by synchronizing to the timing of said display timing generation means.

A 2nd invention of the present invention is a video display unit according to said 1st invention characterized by said instruction sequencer having:

an instruction memory for storing control information to control said arithmetic unit and said data selection means;

an instruction execution control means for reading out at least one or more instructions within one period of the pixel clock; and an instruction decoder means for decoding said read out instructions and for controlling data inputted to said arithmetic unit by said data selection means.

In this way, a video display unit according to the present invention, for example, is provided with an arithmetic unit which performs an arithmetic processing at least once within a period of a pixel clock and an instruction sequencer for controlling the selection and the output of data to be inputted to this, and by synchronizing this instruction to the display clock for execution, implements video up/down scaling processes as well as a blending process with the OSD.

This configuration allows the arithmetic unit and the instruction sequencer to be in a common circuit for corresponding to a plurality of display specifications by switching instructions instead of an implementation method of providing a dedicated circuit for each required specification according to a conventional unit.

This also allows the instructions stored in the instruction sequencer to be re-writable so as to be able to correspond more display specifications easily.

A 3rd invention of the present invention is a video display unit according to said 2nd invention characterized by:

said instruction memory storing execution instruction within at least one period of the pixel clock; and said instruction execution means reading out repetitively said instruction memory by synchronizing to the pixel clock.

This can implement video display processes such as the video up/down scaling as well as a synthetic process with the OSD with only a little instruction memory just for one pixel.

A 4th invention of the present invention is a video display unit according to said 2nd or 3rd invention characterized by having an operational result buffer means for enabling to temporarily memorize outputs of said arithmetic unit and for enabling to output to said data selection means.

This allows to select the arithmetic operational result as an arithmetic unit input freely even on and after the next cycles by storing temporarily the arithmetic operational results so that more kinds of arithmetic processes can be controlled by instructions.

A 5th invention of the present invention is a video display unit according to either one of said 2nd to 4th inventions characterized by having a write back means for writing back data outputs from said arithmetic unit to said output buffer means and the instruction sequencer controlling said write back means.

This allows to provide a screen arranging and displaying a plurality of reduced videos by the function writing a decode video after up-scaling or down-scaling back to the frame memory.

A 6th invention of the present invention is a video display unit according to either one of said 2nd to 5th inventions characterized by said instruction sequencer being provided with a switching means for the number of instructions read out within one period of pixel clock.

This allows to implement a video process only by changing the number of executable instructions even in case 480 or 1080 lines of interlace-scanning and 480 or 720 lines of progressive scanning are mixed for broadcasting, by switching the number of executable instructions within one period of the pixel clock in accordance with the decode video.

A 7th invention of the present invention is a video display unit characterized by comprising: a memory frame for storing display data; a display timing generation means for generating a display timing; a memory control means for reading out display data from said frame memory by synchronizing to the generated display timing; an output buffer means for temporarily storing display data read out by the memory control means; a display data read out means for controlling reading out of display data from said output buffer means in accordance with a desired display specification; a plurality of video processing units for processing display data read out from said display data reading out means; an output selection means for selecting output data of said plurality of video processing units; and an instruction sequencer for controlling said plurality of video processing units and said output selection means by utilizing processing instructions corresponding to a desired display specification within processing instructions corresponding to a plurality of display specifications stored in advance.

A 8th invention of the present invention is a video display unit according to said 7th invention characterized by: each of said video processing units comprising an arithmetic unit for carrying out at least one operation within one period of the pixel clock and for generating display data, and a data selection means for reading out display data by synchronizing to the pixel clock from said output buffer means and for selecting data to be inputted to said arithmetic unit; and said instruction sequencer comprising an instruction memory storing control information for controlling said arithmetic unit and said data selection means, an instruction execution control means for reading out at least one or more instructions within one period of the pixel clock, and an instruction decoder means for controlling data inputted to an arithmetic unit within said plurality of video processing unit by decoding the read out instructions.

The above mentioned configuration allows the arithmetic unit and the instruction sequencer to be in a common circuit in order to be able to correspond to a plurality of display specifications by switching instructions instead of applying an implementation method for providing the dedicated circuit for each required specification such as that in a conventional unit.

In this way, by providing an arithmetic unit for carrying out an arithmetic process at least once within a period of the pixel clock and the instruction sequencer for controlling the selection and the output of the data to be inputted to this, and by synchronizing this instruction to the display clock so as to execute this instruction, video up/down scaling processes and a blending process with the OSD are implemented. Accordingly, a video display process such as video up/down scaling as well as a blending process with the OSD can be described with instructions of the instruction sequencer. And because of the configuration where the same video processing units are arranged in parallel and one instruction sequencer controls this, the pixel clock and the up-scaling in accordance with the arithmetic processing contents have become easy with a simple configuration.

A 9th invention of the present invention is a video display unit according to said 7th invention characterized by: each of said video processing units comprising an arithmetic unit for carrying out at least one operation within one period of the pixel clock and for generating display data, and a data selection means for reading out display data from said output buffer means by synchronizing to the pixel clock and for selecting data to be inputted to said arithmetic unit; and said instruction sequencer comprising an instruction memory storing control information for controlling said arithmetic unit and said data selection means, an instruction execution control means for reading out at least one or more instructions within one period of the pixel clock, and an instruction decoder means provided in each of said plurality of video processing units and for controlling data inputted to an arithmetic unit within the video processing unit by decoding said read out instructions.

This configuration makes it possible to describe a video display process such as video up/down scaling operations as well as a blending process with OSD with instructions of the instruction sequencer. And because of the configuration where the same video processing units are arranged in parallel, which are controlled by the instruction decoder corresponding to each of the video processing units, it has become easy to expand in accordance with the pixel clock and the contents of arithmetic process with a simple configuration.

A 10th invention of the present invention is a video display unit according to said 8th or 9th invention characterized by said instruction memory storing an execution instructions within at least one period of pixel clock, and said instruction execution control means reading out said instruction memory repetitively by synchronizing to the pixel clock.

This allows to implement with only a little instruction memory just for one pixel.

A 11th invention of the present invention is a video display unit according to either one of said 8th to 10th inventions characterized by each of said video processing units having an operational result buffer means for enabling to temporarily memorize outputs of said arithmetic unit and for enabling to output to said data selection means.

In this way, by storing temporarily the arithmetic operational result, it has become possible to select the arithmetic operational result as an arithmetic unit input freely on and after the next cycle so that more kinds of arithmetic processing can be controlled by the instructions.

A 12th invention of the present invention is a video display unit according to either one of said 8th to 11th inventions characterized by having a write back means for writing back output data from each of said video processing units to said output buffer means and said instruction sequencer controlling said write back means.

In this way, a screen which arranges and displays a plurality of reduced videos can be provided by the function of writing decode videos after up/down scaling into the frame memory.

Figure 1:
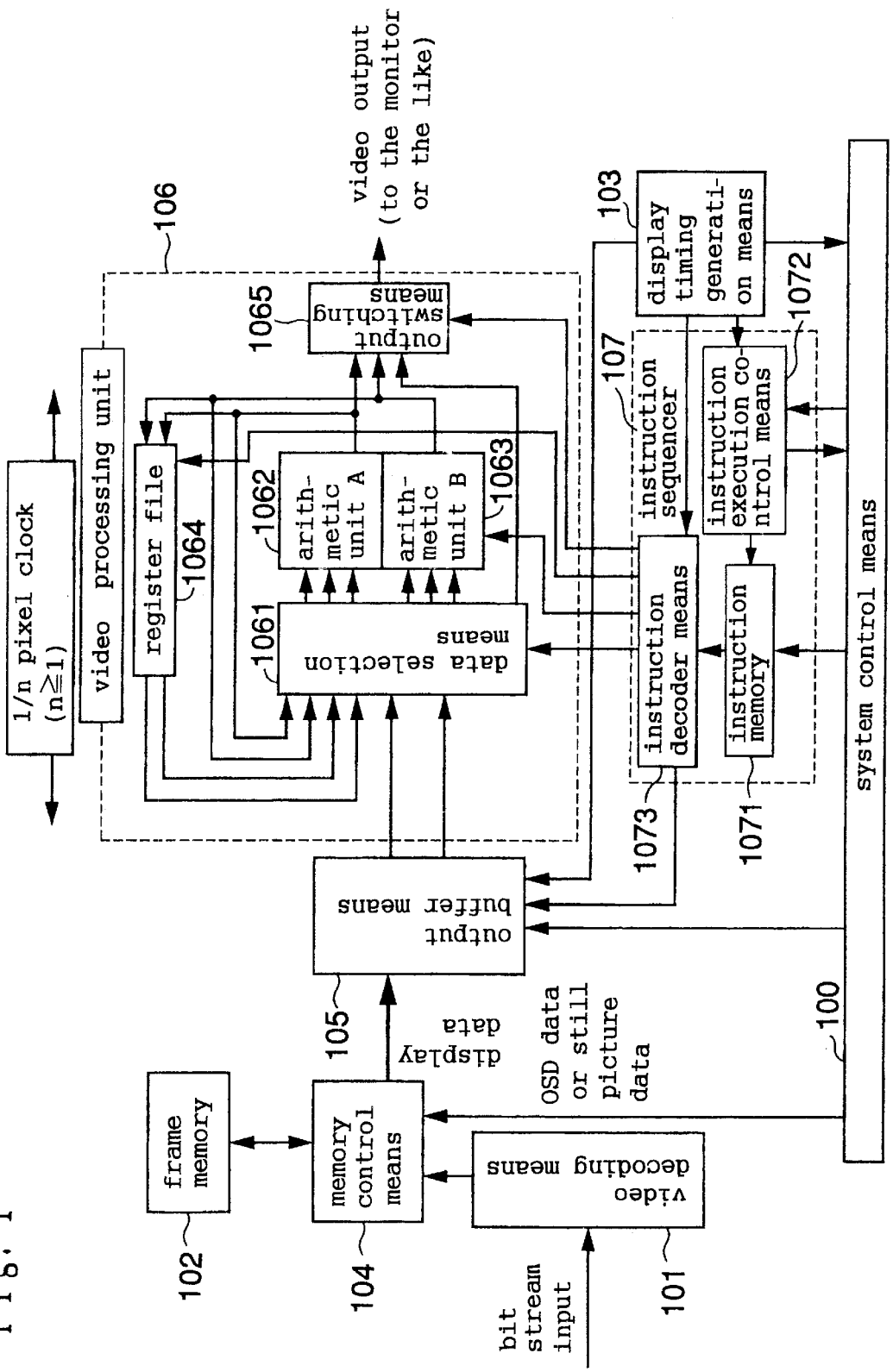
FIG. 1 is a block diagram showing a video display unit according to an embodiment of the present invention.

DESCRIPTION OF THE NUMERALS 100 system control means
101 video decoding means
102 frame memory
103 display timing generation means
104 memory control means
105 output buffer means
106 video processing unit
106A, 106B video processing unit
107 instruction sequencer
108 input and output buffer means
109, 110 output selection means
111 write back means
112 input and output buffer means
1061 data selection means
1062 arithmetic unit A
1063 arithmetic unit B
1064 register file
1065 output switching means
1066 write back means
1071, 1174 instruction memory
1072 instruction execution control means
1073, 1073A, 1073B instruction decoder means
1074 executable instruction number switching means
1108 display data read-out means

BEST MODE FOR CARRYING OUT THE INVENTION

The mode for carrying out the present invention will be described referring to the drawings in the following.

The First Embodiment

One embodiment of a video display unit according to the present invention will be described referring to FIGS. 1 and 2 in the following.

In FIG. 1, a system control part 100, a video decoding part 101, a frame memory 102, a display timing generation means 103, a memory control means 104, and an output buffer means 105 have a similar structure as a corresponding one according to a prior art.

The present embodiment is an example of a video display unit according to claims 1–4.

A video processing unit 106 comprises a data selection means 1061 for reading out a display data from the output buffer means 105 by synchronizing to the pixel clock and for selecting data to be inputted to an arithmetic unit described below, an arithmetic unit A 1062 and an arithmetic unit B 1063, for carrying out an arithmetic operation at least six times during one period of the pixel clock and for generating the display data, a register file 1064 for temporarily storing the arithmetic operational result, and an output switching means 1065.

The data selection means 1061 is provided with a function for controlling the data read out of the output buffer means 105 in accordance with a horizontal up-scaled ratio. This can be implemented by having, for example, an eight bit adder to give a fixed value an increment for each pixel clock, and by applying a carry of the adder for read-out trigger of the next pixel data.

In this case, the horizontal up-scaled ratio can be designated by giving the fixed value an increment, and the eight bit adder output can be utilized as an arithmetic processing coefficient for the horizontal up-scaling process.

The arithmetic unit A (1062) and the arithmetic unit B (1063) carry out the following equations respectively.

The arithmetic unit A (1062): (the operational result)=$\alpha \times A + \beta \times B + C$ The arithmetic unit B (1063): (the operational result)=$\gamma \times D + (1-\gamma) \times E$ wherein A, B, C, D and E represent video data selected by the data selection means 1061. More concretely, they are video data outputted from the output buffer means 105, video data which is the arithmetic operational result carried out in the past by the arithmetic units A(1062) and B(1063), video data for background color or the like, video data of the OSD or the like and video data selected by the data selection means 1061 from fixed value data (for example zero) or the like to enable outputs of specific values. And $\alpha$ and $\beta$ are coefficients for carrying out an arithmetic operation with particular weighting (filter processing) for video input data A and B selected by the data selection means 1061, for example, arithmetic coefficients when processing for the horizontal up-scaling as already mentioned or the arithmetic coefficients to carry out the vertical pixel arithmetic operations, or the like. And $\gamma$ is a blending arithmetic coefficient which enables translucent blending arithmetic operations for video input data D and E selected by the data selection means 1061, and for example, if $\gamma=0$, then E is outputted as it is, and if $\gamma=1$, then D is outputted as it is, and $\gamma=1/2$, then D and E are outputted as translucent videos.

The instruction sequencer 107 is synchronized to the timing of the display timing generation means 103 to control the data selection means 1061, the arithmetic units 1062 and 1063, and comprises the following three.

The instruction memory 1071 stores the control information for controlling the input and output of the arithmetic units 1062 and 1063, the instruction execution control means 1072 controls a plurality of the instruction read-outs within one period of the pixel clock, and the instruction decoder means 1073 decodes the instructions read out of the instruction memory 1071 and controls data inputted to the arithmetic units 1062 and 1063 by using the data selection means 105 [sic].

The instructions select coefficient values α and β and input data A, B and C for the arithmetic unit A 1062, select coefficient value γ and the input data D and E for the arithmetic unit B 1063 and designate where the output of each arithmetic unit should go (information on where the result is written in: whether writing into the resister file 1064 or writing into the output switching means 1065).

Instruction memory 1071 stores 6 instructions and the instruction execution control means 1072 reads out this repetitively by synchronizing to the pixel clock and controls the instruction execution for one line.

Figure 2:
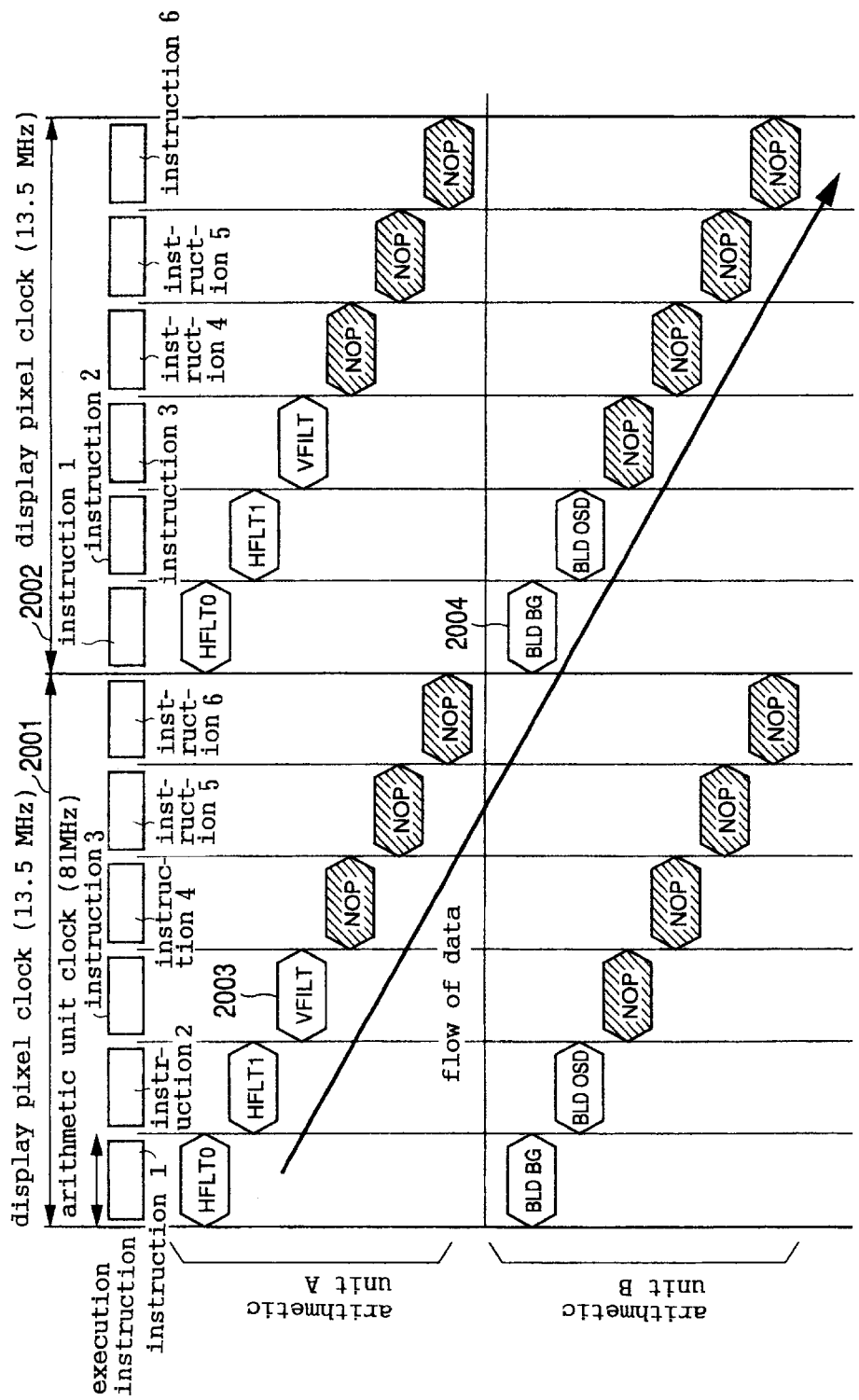
FIG. 2 is a diagram showing an example of an instruction execution in an instruction sequencer of the video display unit shown in FIG. 1.

The mode constructed as mentioned above is described in operation by referring to the FIG. 2.

First of all, the system control means 100 controls the display control to one line unit. More concretely, by the indication of the system control part 100, the memory control means 104 reads out data to be displayed in line unit from the frame memory 102 to the output buffer means 105. The video processing unit 106 and the instruction sequencer 107 generate the output data for one line by utilizing this part of data. The part of the operations until reading out the display data to the output buffer means 105 is the same as that of the prior art. In the case described below the input resolution shown in FIG. 8 (a) is 352×240 and what is displayed is expanded twice in the horizontal and vertical directions. In this case, the output buffer means 105 holds the data for two lines where decode videos are in serial from the frame memory 102.

Figure 7:
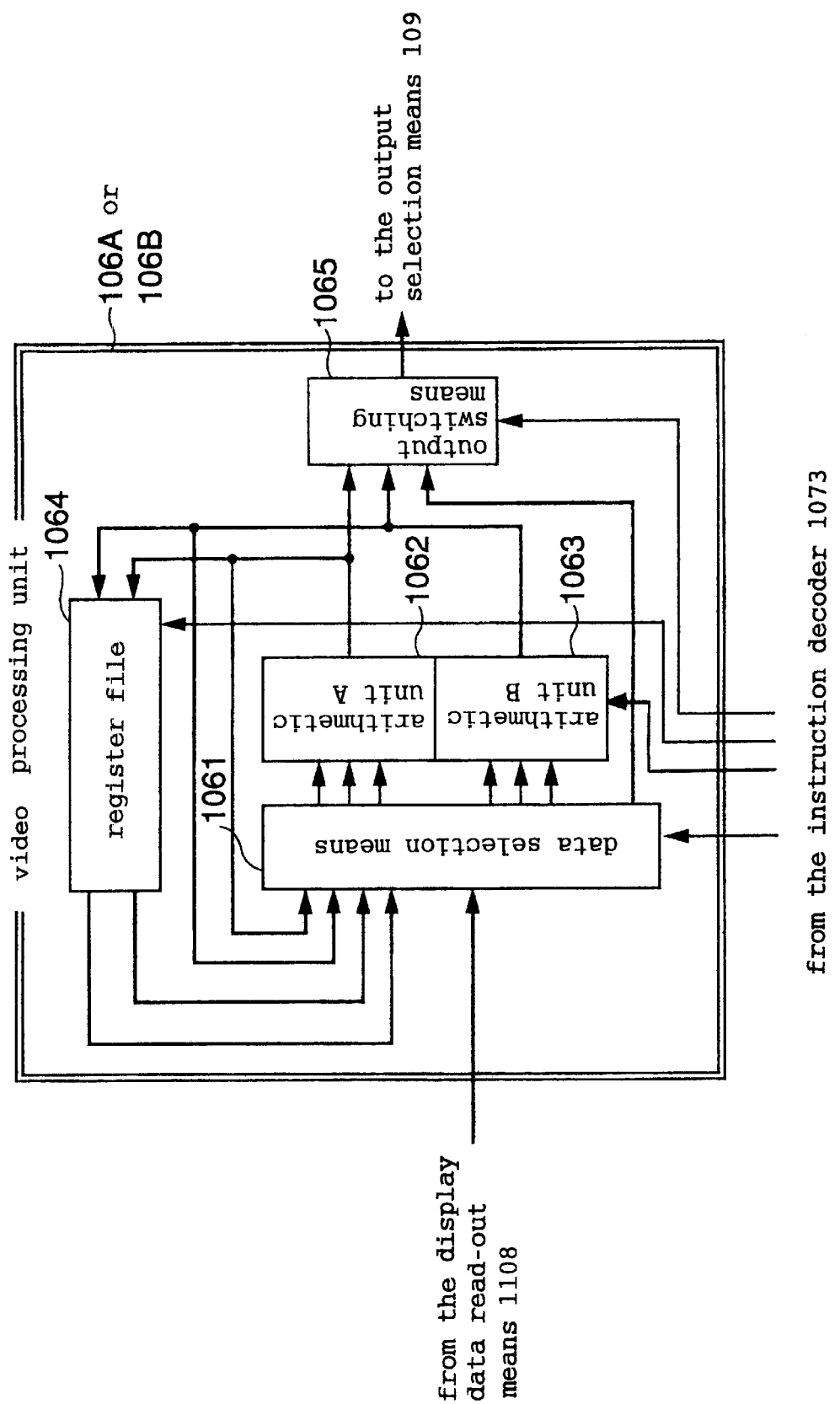
FIG. 7 is a block diagram showing a video processing unit in the video display unit according to the forth embodiment.

FIG. 2 shows an example which implements a video processing in FIG. 7 according to a prior art, having a pixel clock of 13.5 MHz and an operational clock of the video processing unit and the instruction sequencer, six times as fast as this, that is of 81 MHz.

The instruction execution control means 1072 synchronizes to the pixel clock to read out repetitively the instructions on $0^{th}$ to $5^{th}$ address of the instruction memory 1071. The instruction decoder means 1073 decodes the instructions read out and controls the data selection means the arithmetic unit A 1062 and the arithmetic unit B 1063 as follows.

The arithmetic unit A:
(1) instruction 1: The data selection means 1061 selects the horizontal two pixel data of the first line of the decode video (video) and the coefficient value data, and carries out the multiplication and addition processes using the same data. The arithmetic operational result is written into the register file 1064. Thereby, the horizontal up-scaling process of the first line (horizontal arithmetic operation) is carried out.
(2) instruction 2: The data selection means 1061 selects the horizontal two pixels of the second line and the coefficient value data and carries out the multiplication and addition processes using the same data. The arithmetic operational result is passed through (feedback to the data selection means). Thereby, the horizontal up-scaling process (horizontal arithmetic operation) of the second line is carried out.
(3) instruction 3: The data selection means 1061 selects the register file data written into under the instruction 1 and the arithmetic operational result of the instruction 2 (which was passed through), and carries out the multiplication and addition processes. Thereby, the vertical up-scaling process (vertical arithmetic operation) by the first line and the second line data is carried out. The arithmetic coefficient values α and β are realized by allowing the data selection means 1061 to have a coefficient register and using the α and β setted in line unit by the system control means 100. The arithmetic operational result is written into the register file 1064.
(4) instruction slots 4–6 don't particularly carry out instruction executions.

Operation here is described referring to FIG. 2. For example, the arithmetic operational result 2003 carried out by the instruction 3 during the term 2001 (corresponding to the data written in the register file 1064) is utilized in an arithmetic processing 2004 at the instruction 1 in the term 2002 described later.

The abbreviated marks utilized in FIG. 2 are described below. HFLT0 is an abbreviation of Horizontal Filter 0, which means an horizontal filter processing of the first line. HFLT1 is an abbreviation of Horizontal Filter 1, which means a horizontal filter processing of the second line. VFLT is an abbreviation of a Vertical Filter, which means a vertical filter processing. NOP is an abbreviation of No Operation, which means nothing is processed. BLD BG is an abbreviation of Blend with Background (background color), meaning a blending process with background color. In addition, BLD OSD is an abbreviation of Blend with OSD, meaning a blending process with the OSD data.

The arithmetic unit B:
(1) instruction 1: The data selection means 1061 selects the data of register file 1064 written under the instruction 3 of the arithmetic unit A and a register value which becomes a background color (held in the data selection means 1061) and carries out an arithmetic operation. The arithmetic coefficient value γ is generated from an effective display term signal of the decode video in the data selection means 1061. The arithmetic operational result is passed through (feedback to the data selection means). Thereby, the data painted out outside of the effective display area with a particular background color is generated. The effective display term signal is a signal to designate the video display area.
(2) instruction 2: The data selection means 1061 selects the arithmetic operational result of the instruction 1 and the OSD data to carry out the blending process. The OSD data has a blended value with the video data (γ coefficient value). The arithmetic operational result is written into the output switching means 1065 to be outputted to the external monitor.

The instructions for one pixel (six steps) are described as the above and are executed repetitively by synchronizing to the pixel clock, as shown in FIG. 2, by the instruction execution control means 1072, thereby, video data for one line can be generated. The up-scaling process for the decode video can be coped with by changing the instructions 1–3 in the arithmetic unit A. For example, the case of the horizontal up-scaling process can be coped with by executing only the instruction 1 and leaving the instructions 2–6 as NOP (no operation).

Figure 3:
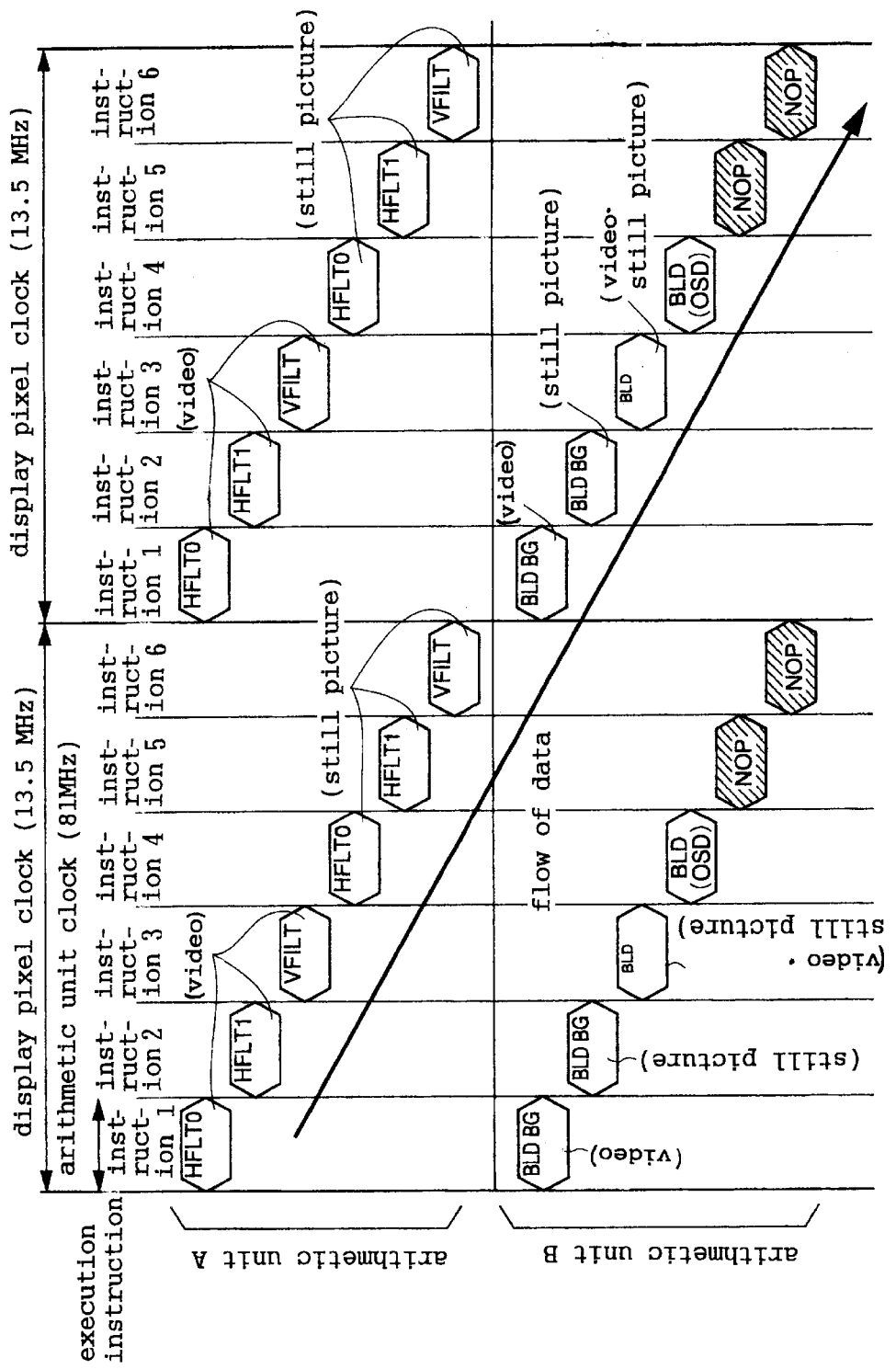
FIG. 3 is a diagram showing another example of an instruction execution in an instruction sequencer of the video display unit shown in FIG. 1.
Figure 9:
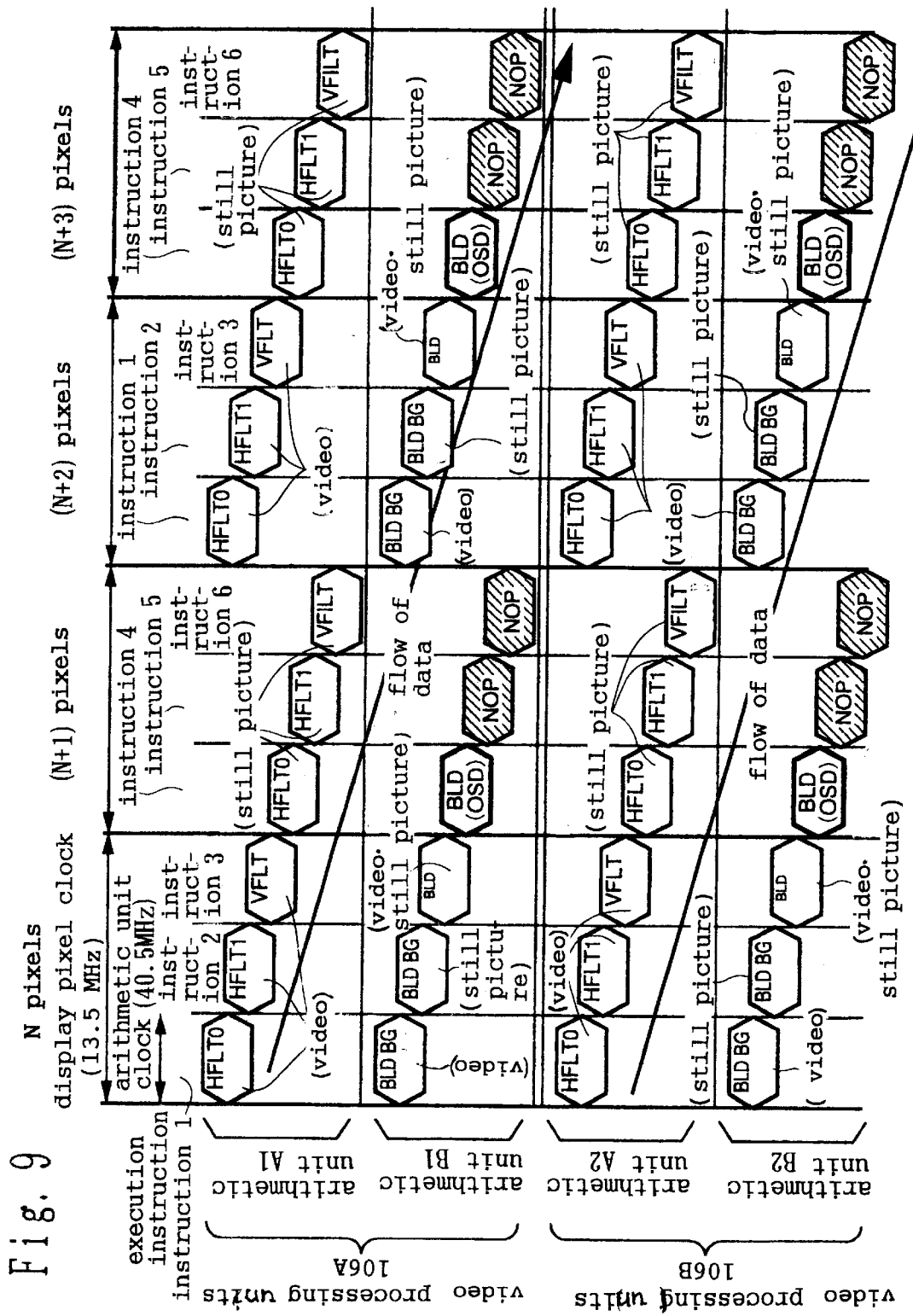
FIG. 9 is a diagram showing another example of an instruction execution in an execution sequencer of the video display unit shown in FIG. 6.

On the other hand, FIG. 3 is an example that realized the video processing of FIG. 9 according to a prior art in a video display unit of FIG. 1. In the following description, two types of screens, the decode video (video) and the still picture data are reduced into ½ in each of the horizontal and vertical directions. At the time of vertical ½ down-scaling, an interpolation processing is carried out by serial two lines to generate the data. In the same way as FIG. 2, the pixel clock is 13.5 MHz and the operational clock for video processing unit and the instruction sequencer is six times as fast as that, which is 81 MHz. The instruction controlled in the instruction sequencer 107 is controlled as follows.

Arithmetic unit A:

(1) instructions 1–3: The same contents as described in FIG. 2.

(3) instructions 4–6: The execution contents are same as instructions 1–3, but there exists one difference that the data selection means 1061 selects still picture data as arithmetic processing data.

Arithmetic unit B:

(1) instruction 1: The data selection means 1061 selects the register file 1064 written in under the instruction 3 of the arithmetic unit A and the register value which becomes background color (held in the data selection means 1061) to carry out the operation. The operational result is written into the register file 1064.

(3) instruction 2: The data selection means 1061 selects the register file 1064 written in under the instruction 6 of the arithmetic unit A and the register value which becomes background color (held in the data selection means 1061) to carry out the operation. The operational result is passed through.

(4) instruction 3: The data selection means 1061 selects the register file 1064 written in under the instruction 1 and the arithmetic operational result of the instruction 2 to carry out the operation. The arithmetic coefficient vale γ is generated from the active display period signal of the decoded picture (video) and this is selected in the data selection means 1061. The arithmetic operational result is passed through.

(5) instruction 4: The data selection means 1061 selects the arithmetic operational result of the instruction 3 and the OSD data to carry out the operation. The arithmetic operational result is written into the output switching means 1065 to be outputted to the external monitor.

As described above, in the same video display unit as shown in FIG. 1, the instructions of FIG. 3 can be carried out so as to cope with the video processing shown in FIG. 9 easily.

Accompanying with the recent development of the semiconductor technology, the operational frequency of the circuits has been rapidly increasing and it has been becoming easier to enhance the operating clock of the arithmetic units or the like against the pixel clock. For example, if they are implemented with a frequency higher than 81 MHz, it is possible to display two still pictures or videos easily in accordance with the configuration of the present invention.

Though the embodiment of FIG. 1 is implemented by carrying out the filter arithmetic operation and a blending operation separately by two arithmetic units, the present invention is not particularly limited to that configuration. For example, it may be implemented with one arithmetic unit or with a plurality of arithmetic units combined together. The arithmetic units are not limited-to the multiplication and addition processes as described in the above embodiment, but other arithmetic operation may be carried out.

In the above mentioned embodiment, the instruction memory size is described as for one pixel, but it could be for a plurality of pixels or for one line. And though the embodiment is described with a configuration using a register file, it could be implemented without a register file if the instructions are designated so as to use the arithmetic operational result for every cycle.

The Second Embodiment

Figure 4:
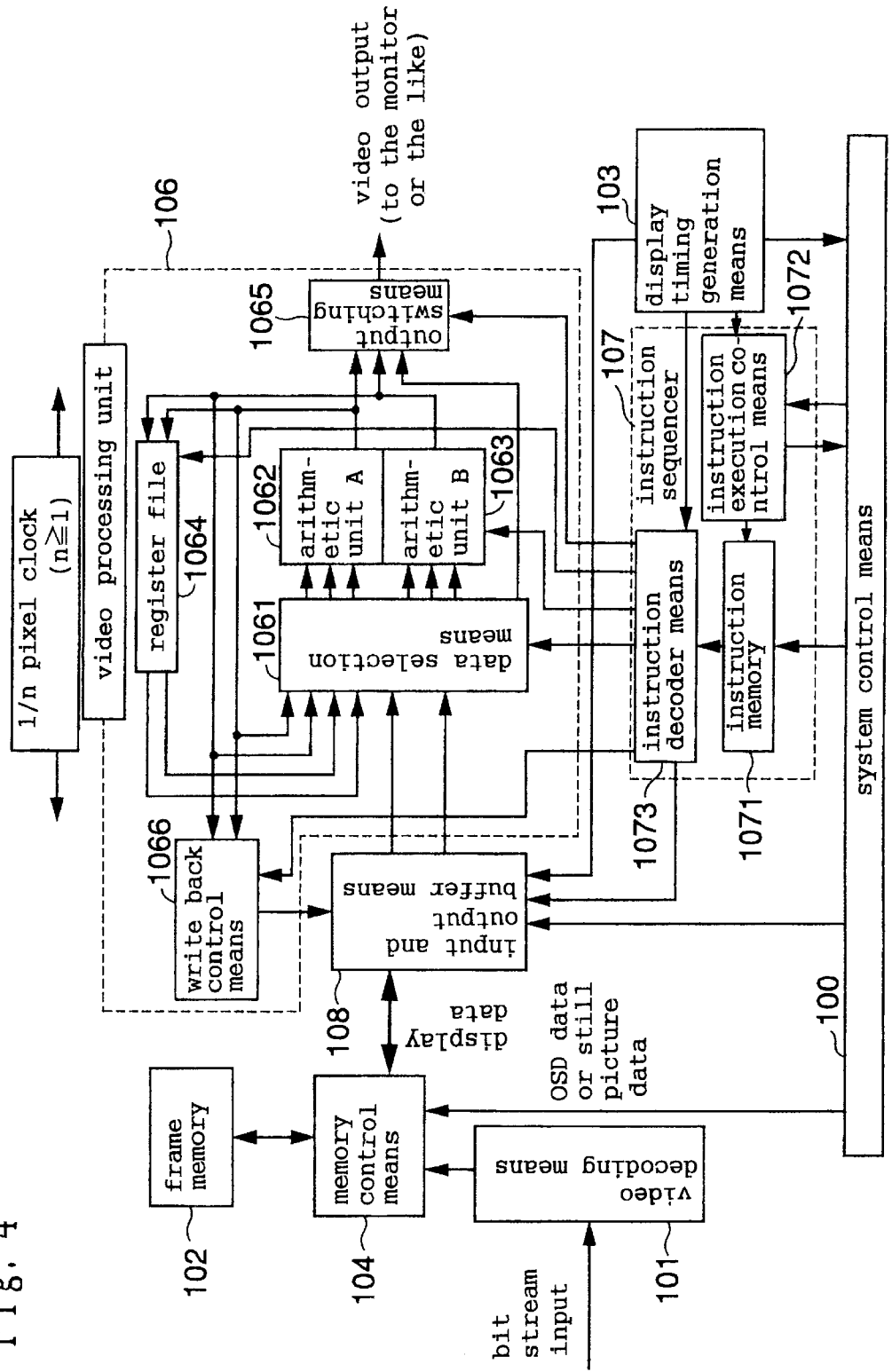
FIG. 4 is a block diagram showing a video display unit according to the second embodiment of the present invention.

Another exemplary embodiment of a video display unit according to the present invention is described referring to FIG. 4, next.

The same numerals are applied for the same components as FIG. 1 and the descriptions are omitted for them.

This mode is an example of a video display unit according to claim 5.

In this Figure, the write back means 1066 carries out the control for writing back the output data from the arithmetic units A 1062 and B 1063, and the input and output buffer means 108 is provided with the function.for writing the written back data from the write back means 1066 to the frame memory 102 in addition to read out the display data from the frame memory 102.

Complying with the instruction of the instruction sequencer 107, by selecting the write back means 1066 into which the arithmetic results are written, the decode video after being processed or the like are written into the input and output buffer means 108.

In operation, when the write back means 1066 is selected from the instruction decoder means 1073, the output data from the arithmetic units A 1062 or B 1063 are once stored in the write back means 1066.

The write back means 1066 transfers the stored data to the input and output buffer means 108 in other cycles than the display read-out. The system control part 100 controls the transfer of writing to the frame memory 102 by the memory control means 104 after the arithmetic operational result data for one line are written in.

If the written back video is read out of the frame memory 102 as a still picture to be displayed, it becomes possible to display a plurality of reduced decode videos arranged in order, for example, a user interface screen can be easily provided in such a form as a reduced still picture fitted into a program table.

The Third Embodiment

Figure 5:
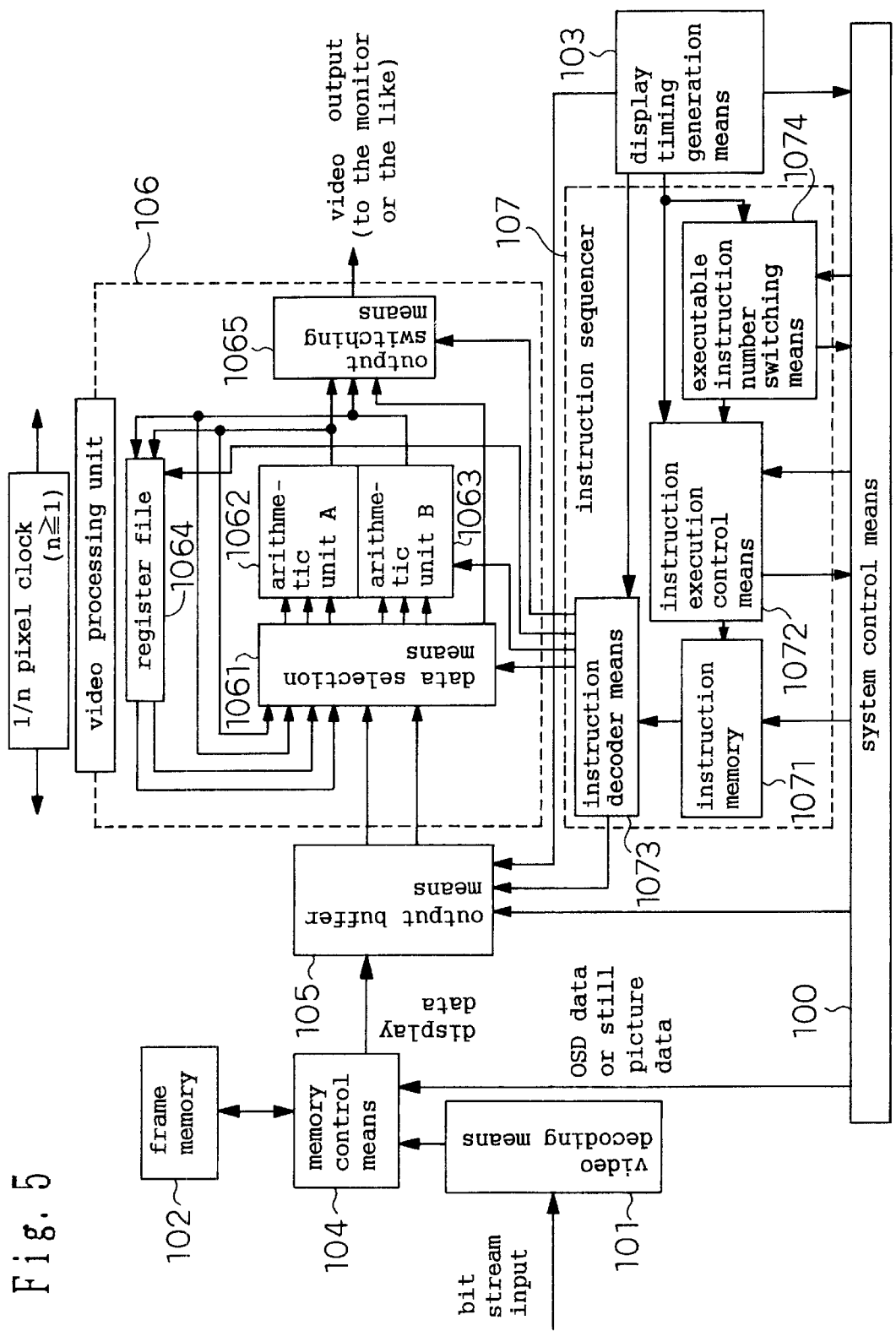
FIG. 5 is a block diagram showing a video display unit according to the third embodiment of the present invention.

Another exemplary embodiment of a video display unit according to the present invention is described referring to FIG. 5, next.

The same numerals are applied for the same components as FIG. 1 and the descriptions for them are omitted. This mode is an example of a video display unit according to claim 6.

In the digital broadcasting, a broadcasting service of a different frame rate may be provided. For example, it is a mixed broadcasting of 480 or 1080 lines of interlace scanning and 480 or 720 lines of progressive scanningr. In this case, it is necessary to switch the clock for display depending on the decode videos.

In the present embodiment, a video display unit is described which leaves the operating frequency of video processing unit 106 and the instruction sequencer 107 as it is, while switching only the number of executable instructions within one period of the pixel clock to cope with such a case.

The executable instruction number switching means 1074 is for switching the instruction number read out within one period of the pixel clock, which is controlled by the system control part 100.

In operation, the system control part 100 sets the instruction number which is set in advance into the executable instruction number switching means 1074, on switching the display clock based on the resolution information of the decode video.

The instruction execution control means 1072 reads out repetitively the part corresponding to the instruction number designated by the execution instruction number switching means 1074.

The above mentioned configuration makes it possible to implement a video processing without causing any problems even in case the display clock is switched.

As described above, according to a video display unit of the present invention, a variety of functions can be implemented easily by combining instructions corresponding to the common hardware and display requirement specifications for different display requirement specifications depending on the service providers. And it is also possible to implement the instruction memory of a little size only for one pixel, and the circuit scale can also be realized without almost changing from a conventional unit.

The present invention will be described based on the drawings illustrating the modes as follows.

The Forth Embodiment

Figure 6:
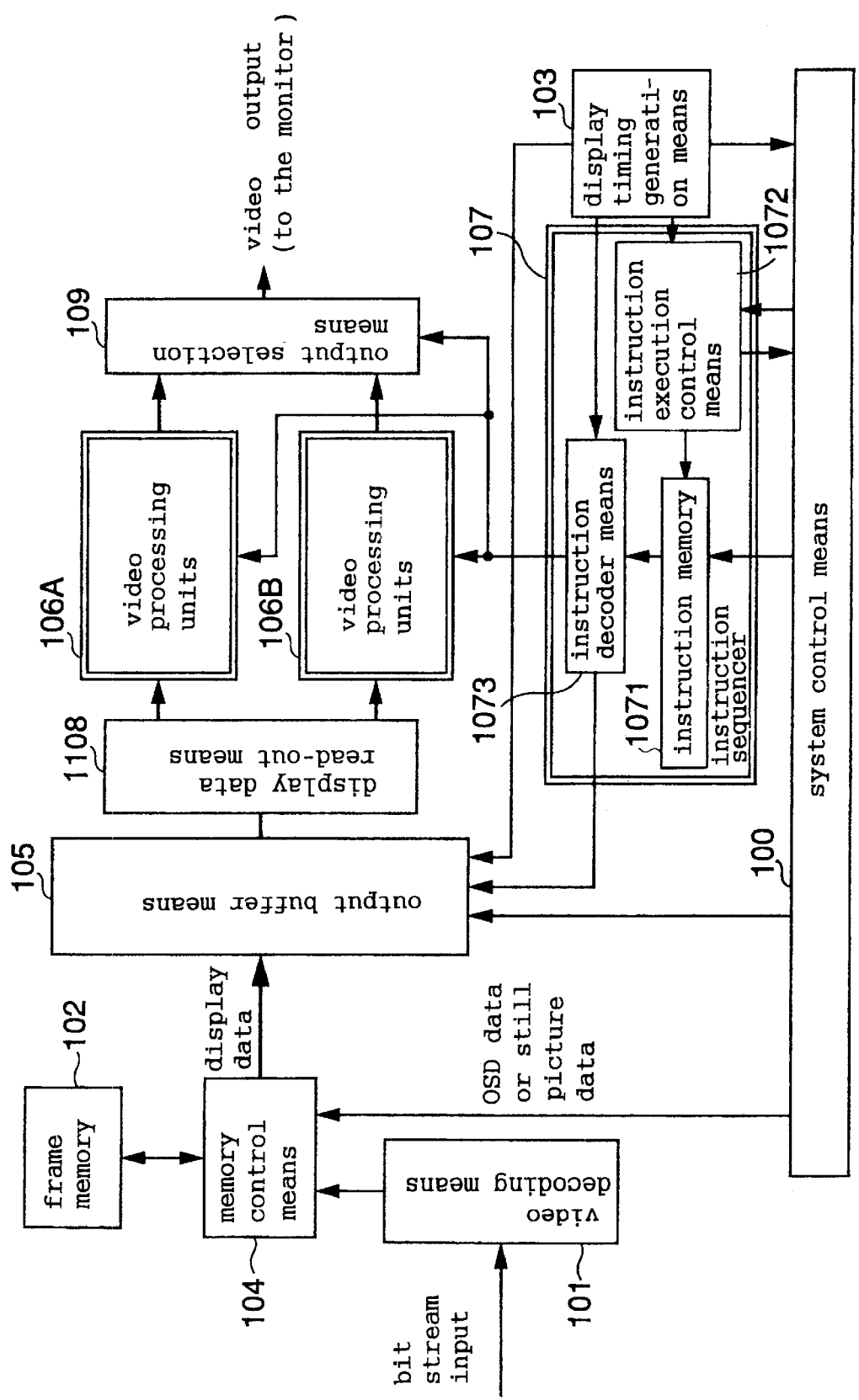
FIG. 6 is a block diagram showing a video display unit according to the forth embodiment of the present embodiment.

FIG. 6 is a block diagram showing a video display unit of the forth embodiment according to the present invention, and FIG. 7 is a block diagram showing the configuration of a video processing unit in the video display unit.

In FIG. 6, the system control means 100, the video decoding means 101, the frame memory 102, the display timing generation means 103, the memory control means 104, and output buffer means 105 have the same structure as that of a corresponding one in a prior art.

The present mode is an example of a video display unit according to claims 7, 9 and 10.

The video processing units 106A and 106B generate output data from the data in the output buffer means 105 the two of them are operated in parallel in the present mode. This video processing unit comprises, as shown in FIG. 7, a data selection means 1061 for selecting data inputted to the arithmetic unit described later, the arithmetic units A 1062 and B 1063 for carrying out three operations to the pixel clock, a register file 1064 which is an arithmetic operational result buffer means for storing temporarily the arithmetic operational result, and the output switching means 1065.

A display data read-out means 1108 controls the read-out of the data from the output buffer means 105 according to a horizontal up-scaled ratio. For example, it has an eight bit adder to give the fixed value an increment and applying a carry of the adder as a trigger for reading out the next pixel data, thereby, controls the read-out from the output buffer means 105. In this case, the horizontal up-scaled ratio can be designated with the fixed value which may be given an increment, and the eight bit adder output can be utilized as an arithmetic processing coefficient at the time of the horizontal up-scaling process.

In the present mode, two video processing units process two pixels at the same time, and therefore, the above mentioned increment is given twice to the fixed value within one pixel. The display data read-out means 1108 outputs the first read-out data and the arithmetic operational coefficient to the video processing unit 106A and outputs the second read out data and the arithmetic operational coefficient to the video processing unit 106B.

On the other hand, the arithmetic units A1062 and B 1063 of a video processing unit carry out the following equations, respectively.

The arithmetic unit A 1062: (the arithmetic operational result)=$\alpha \times A + \beta \times B + C$ The arithmetic unit B 1063: (the arithmetic operational result)=$\gamma \times D + (1-\gamma) \times E$ wherein A, B, C, D and E are video data selected by the data selection means 1061 described below, and video data selected by the data selection means 1061 from video data outputted through display data read-out means 1108 from the output buffer means 105, video data as the arithmetic operational results processed in the past by the arithmetic units A 1062 and B 1063, video data of background color or the like, video data of the OSD or the like and fixed value data for enabling the output of a particular value (for example, zero) and the like. And $\alpha$ and $\beta$ are coefficient values for carrying out operations with particular weighting for the video input data A and B selected by the data selection means 1061 (filter process), and, for example, arithmetic coefficients at the time of horizontal up-scaling process as already described or arithmetic coefficients to carry out a vertical pixel operation or the like. And $\gamma$ is a blending arithmetic operational coefficient to enable a translucent blending operation for video input data D and E selected by the data selection means 1061, and for example, if $\gamma=0$, then E is outputted as it is, if $\gamma=1$, then D is outputted as it is, and if $\gamma=1/2$, then D and E are outputted as translucent videos.

The instruction sequencer 107 synchronizes to the timing of the display timing generation means 103 and controls two video processing units 106A and 106B, which is constructed from the following three components.

The instruction memory 1071 stores the control information for controlling the inputs and the outputs of the arithmetic units A 1062 and B 1063, the instruction executable control means 1072 controls a plurality of instruction readouts within one period of the pixel clock, and the instruction decoder means 1073 decodes the instructions read out of the instruction memory 1071, and controls the data inputted to the arithmetic units A 1062 and B 1063 for the data selection means 1061.

The instruction selects the coefficient values $\alpha$ and $\beta$ as well as the input data A, B, and C for the arithmetic unit A 1062 and selects the coefficient value $\gamma$ and the input data D and E for the arithmetic unit B 1063 with respect to the video processing unit 106A and 106B, respectively, and designates the output address of each of the arithmetic units (information to where the results are written in: whether written into the register file 1064 or into the output switching means 1065). That is to say, two video processing units are controlled at the same time with common instructions.

The instruction memory 1071 stores six instructions, and the instruction executable control means 1072 reads this out repetitively, with two pixels in one period, and controls the instruction execution for one line.

The output selection means 109 temporarily stores two parts of data generated from two video processing units 106A and 106B, and selects the data so as to be outputted alternatively one pixel by one pixel while synchronizing to the display clock.

A video display unit of the present mode which is configured as described above is described in operation referring to the drawings.

Figures 16A, 16B:
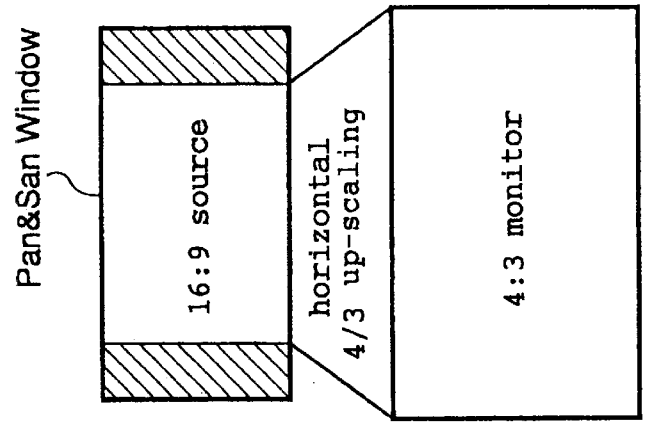
FIG. 16(a) is a diagram showing a video output specification in a digital broadcasting receiver.
FIG. 16(b) is a diagram showing a pan-scan display process in a digital broadcasting receiver.

First of all, the system control means 100 controls the display unit per line unit. More concretely, following the indication of the system control means 100, the memory control means 104 reads out the data to be displayed from the frame memory 102 to the output buffer means 105 per line unit. The video processing units 106A and 106B as well as the instruction sequencer 107 use those data to generate the output data for one line. The part of the operations until reading out the display data to the output buffer means 105 is same as that according to a prior art. In the following, the case where the input resolution as shown in FIG. 16 (a) is 352×240 is described so as to be enlarged twice as large in the horizontal and vertical directions when displayed. In this case, the output buffer means 105 holds the data for sequential two lines of the decode video from the frame memory 102.

Figure 8:
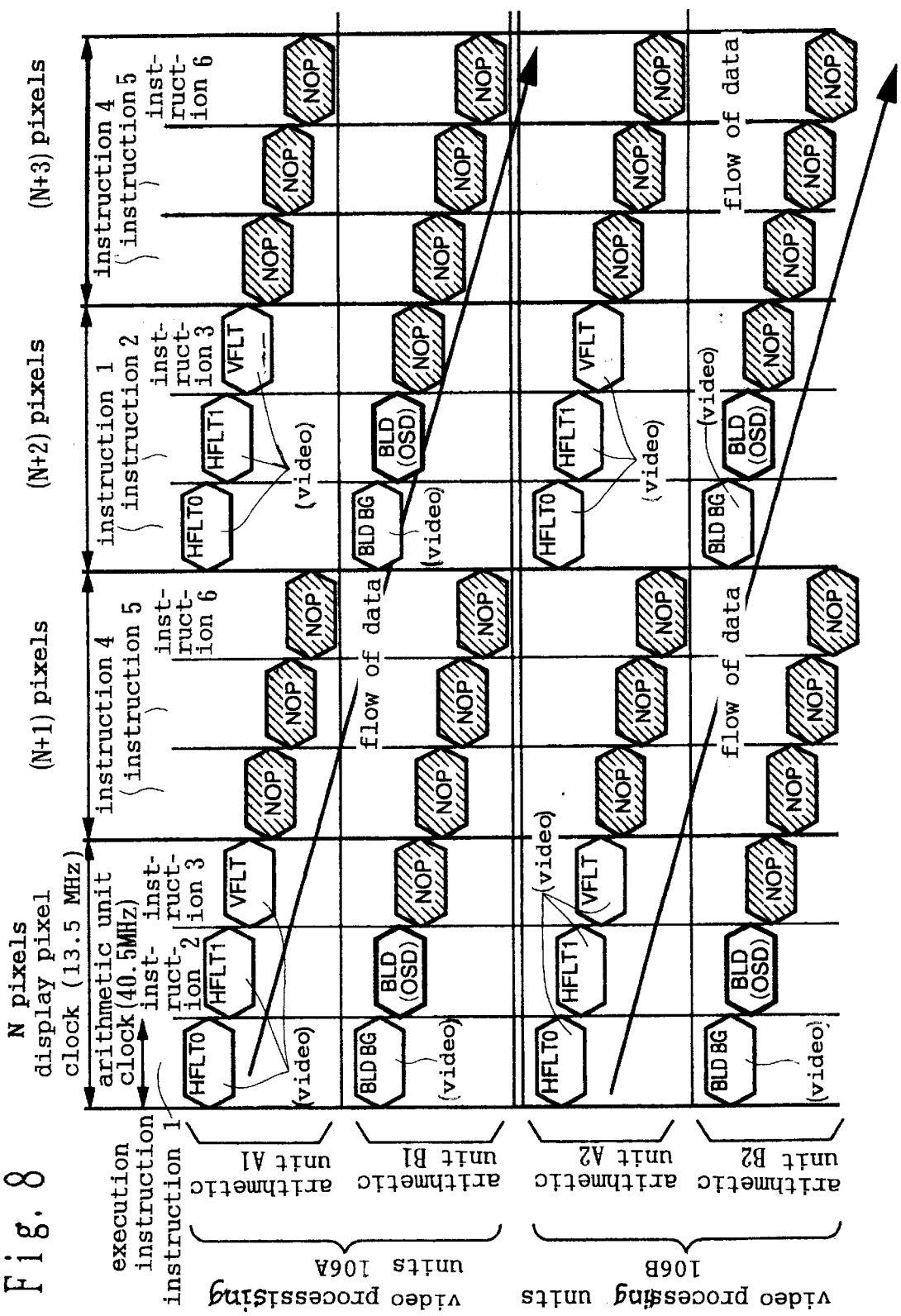
FIG. 8 is a diagram showing an example of an instruction execution in an instruction sequencer of the video display unit shown in FIG. 6.
Figure 15:
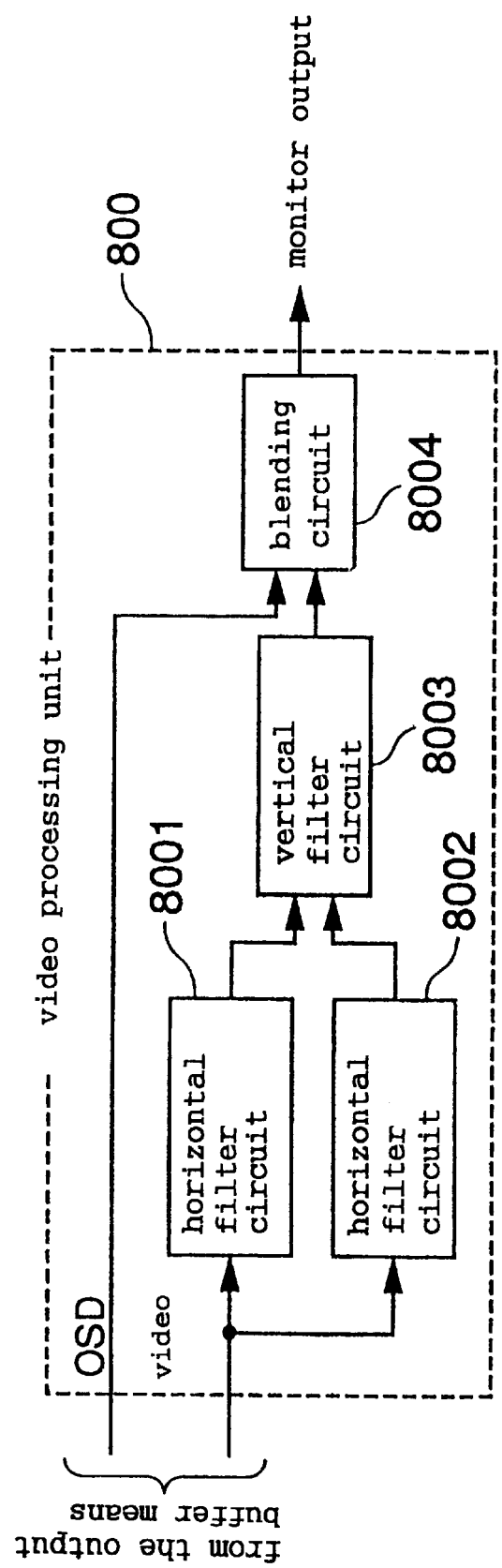
FIG. 15 is a block diagram of a video processing unit in detail in a video display unit according to a prior art.

FIG. 8 shows an example where a video processing of FIG. 15 according to a prior art is implemented, where the pixel clock is 13.5 MHz and the operating clock of the video processing unit and the instruction sequencer is three times as fast, which is 40.5 MHz.

The instruction executable control means 1072 repetitively reads out the instructions on $0^{th}$ to $5^{th}$ address of the instruction memory 1071, with two pixels in one period. The instruction decoder means 1073 decodes the instructions read out, and controls the data selection means 1061 of the video processing units 106A and 106B and the arithmetic units A 1062 and B 1063 as follows. Wherein the video processing unit 106A generates the data of 2N pixels while the video processing unit 106B generates the data of (2N+1) pixels.

Arithmetic unit A:
(1) instruction 1: The data selection means 1061 selects the horizontal two pixel data of the first line of the decode video (video) and the coefficient value data to carry out the multiplication and addition processes using the same data. The horizontal two pixel data and the coefficient value are inputted from the data read-out means 1108. The operational result is written into the register file 1064.
(2) instruction 2: The data selection means 1061 selects the horizontal two pixels of the second line and the coefficient value data to carry out the multiplication and addition processes using the same data. The horizontal two pixel data and the coefficient value are inputted from the data read-out means 1108 in the same way as the instruction 1. The operational results are passed through (feedback to the data selection means).
(3) instruction 3: The data selection means 1061 selects the register file data that is written in under the instruction 1 and the operational result of the instruction 2 (which is passed through) to carry out the multiplication and addition operation. Thereby, the vertical operation by the data of the first line and the second line are carried out. The operational coefficient values α and β are realized by allowing the data selection means 1061 to have the coefficient register so as to be set per line unit by the system control means 100. The operational result is written into the register file 1064.
(4) The instruction slots 4–6 won't carry out the instruction execution particularly.

Arithmetic unit B:
(1) instruction 1: The data-selection means 1061 selects the data of the register file 1064 written in under the instruction 3 of the arithmetic unit A and a register value which becomes background color (held in the data selection means 1061) to carry out an operation. The arithmetic coefficient value γ is generated from the effective display term signal of the decode video in the data selection means 1061. The operational result is passed through (feedback to the data selection means). Thereby, the data to paint out the area outside the effective display with a particular background color is generated.
(2) instruction 2: The data selection means 1061 selects the operational result of the instruction 1 and the OSD data to carry out a blending process. The OSD data has a blending value with the video data (γ coefficient value). The operational result is written into the output switching means 1065 to be outputted to the external monitor.
(3) The instruction slots 3–6 won't perform the instruction execution particularly.

The output of the arithmetic unit B 1063 of the two video processing units 106A and 106B is inputted to the output selection means 109 and selected and outputted alternately by synchronizing to the pixel clock. More concretely, the output selection means 109 latches data from the video processing unit 106A and video processing unit 106B at the same time for every two pixels so that the latch data of video processing unit 106A is outputted first followed by outputting the data of the video processing unit 106B with a delay of one pixel.

As described above, the instruction execution control means 1072 carries out instructions (six steps) repetitively by synchronizing to the pixel clock, and can generate video data for one line by operating the two video processing units. The up-scaling processing for the decode video can be coped with by changing the instructions 1–3 in the arithmetic unit A. For example, the case of a horizontal up-scaling process can be coped with by executing the instruction 1 only and by allowing instruction 2–6 to be NOP (no operation).

On the other hand, in FIG. 9, an example is shown which has realized a video processing of FIG. 15 according to a prior art in the video display unit of FIG. 6. In the following, two kinds of screens of the decode video (video) and the still picture data are described as they are reduced into ½ in the horizontal and vertical directions, respectively. As for the time of vertical down-scaling into ½, the data is generated by carrying out an interpolating process by the sequential two lines.

In the same way as FIG. 8, the pixel clock is set at 13.5 MHz while the operating clock of the video processing units 106A and 106B as well as the instruction sequencer 107 is set three times as fast as that, which is 40.5 MHz. The instruction controlled by the instruction sequencer 107 is controlled as follows.

Arithmetic unit A:
(1) instructions 1–3: The same contents as described in FIG. 8.
(3) instructions 4–6: The executable contents are same as the instructions 1–3, but are different in the point that the still picture data are selected as the arithmetic operational data from that data selection means 1061.

Arithmetic unit B:
(1) instruction 1: The data selection means 1061 selects the register file 1064 written in under the instruction 3 of the arithmetic unit A and the register value (held in the data selection means 1061) to carry out an operation. The operational result is written into the register file 1064.
(4) instruction 2: The data selection means 1061 selects the register file 1064 written in under the instruction 6 of the arithmetic unit A and the register value which will become the background color (held in the data selection means 1061) to carry out an operation. The operational result is passed through.

(5) instruction 3: The data selection means 1061 selects the register file 1064 written in under the instruction 1 and the operational result of the instruction 2 to carry out an operation. The operational coefficient value γ is generated from the effective display term signal of the decode video (video) in the data selection means 1061, and this is selected. The operational result is passed through.

(6) instruction 4: The data selection means 1061 selects the operational result of the instruction 3 and the OSD data to carry out an operation. The operational result is written into the output switching means 1065 to be outputted to the external monitor.

As described above, the same video display unit as shown in FIG. 6 can execute the instructions of FIGS. 8 and 9 so as to cope with the video processing shown in FIG. 15 easily.

According to the present.embodiment as described above, one instruction sequencer can control a plurality of video processing units and a variety of display processing can be realized by combining the instructions.

And by unifying the control system of the video processing into one, the increase of the circuit scale is controlled, and by having a configuration that a plurality of video processing unit process in parallel, the following effects can be gained.

Even in case the video resolution increased, the similar video processing can be realized by increasing the number of the video processing units operated in parallel. Particularly it has been becoming necessary to cope with a high definition (the resolution exceeds 720 pixels×480 lines) system in future and the possibility of realizing that is becoming an important point.

In designing an LSI, it is easier for the developer to use the same circuits in parallel than to design totally new circuits.

Though, in the above described embodiment, two video processing units are described, the present invention doesn't limit the number particularly. And though in FIG. 6, a filter operation and blending operation are separately carried out by two arithmetic units, the present invention doesn't limit the configuration in particular to implement it. For example it may be realized by one arithmetic unit or it may be combined with a plurality of arithmetic units. The arithmetic units are not limited to having the multiplication and addition processes as described in the above mentioned mode but may be the ones to carry out other operational processes.

In the above mentioned embodiment, the instruction memory is described as having the size of two pixels, but it may be provided with a size of a plurality of pixels or for one line.

In the above mentioned mode, it is described as having a configuration using a register file which is an operational result buffer means, but it can be implemented without having a register file if the instructions are designated so that the operational result is used for each cycle.

The Fifth Embodiment

Figure 10:
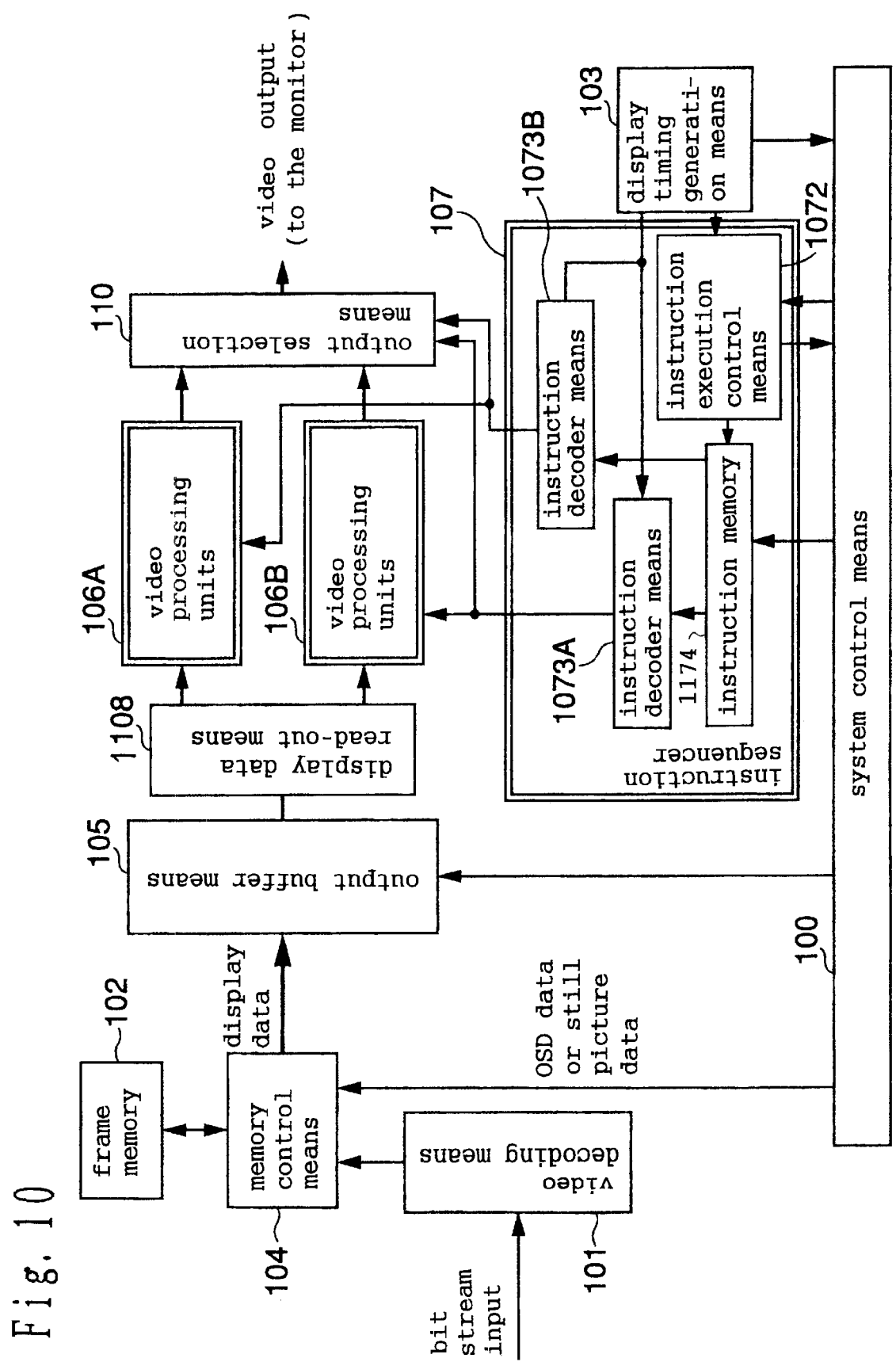
FIG. 10 is a block diagram of a video display unit according to the fifth embodiment of the present invention.

FIG. 10 is a block diagram showing a video display unit according to the fifth embodiment of the present invention.

The present embodiment is same as the above mode in the point where one instruction sequencer controls a plurality of video processing units in the same way as in FIG. 6, but different in the point where the instruction decoder of the instruction sequencer is provided for each video processing unit. The same numerals are applied for the same components as FIG. 6, of which descriptions are omitted.

The present mode is an example of a video display unit according to claim 8.

The instruction decoder means 1073A and 1073B have the same function as that of the instruction decoder means 1073 in FIG. 6. Though the instruction memory 1174 stores the six instructions in the same way as the instruction memory 1071 in FIG. 6, it is different in the point where two instructions are read out at the same time by the control of the instruction execution control means 1072. The output selection means 110 temporarily stores two parts of data generated from the two video processing units 106A and 106B respectively to be outputted by synchronizing to the display clock.

The video display unit according to the present mode configured as described above will be described in operation referring to the drawings.

Figure 11:
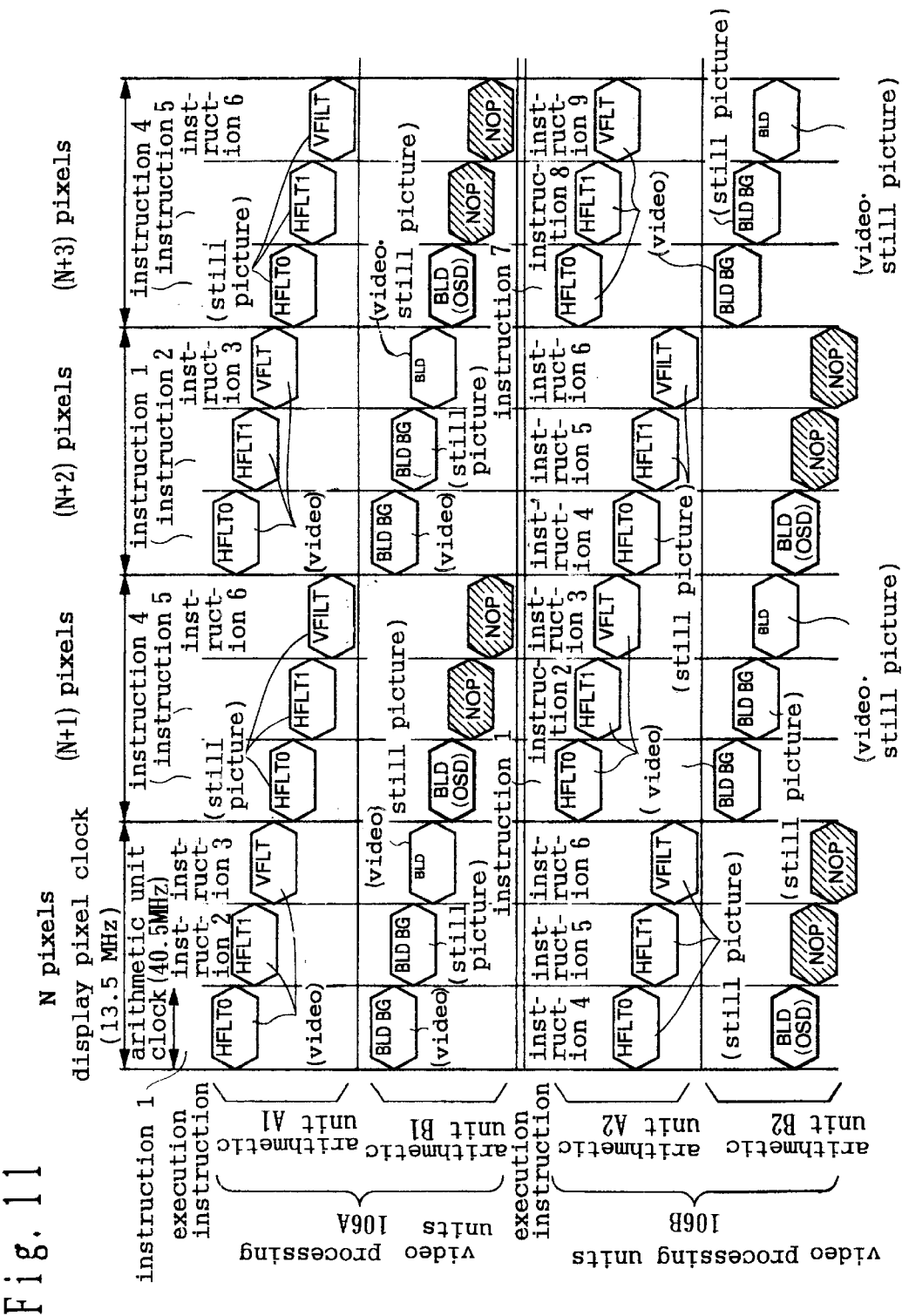
FIG. 11 is a diagram showing an example of an instruction execution in an instruction sequencer of a video display unit according to the fifth embodiment.
Figure 17:
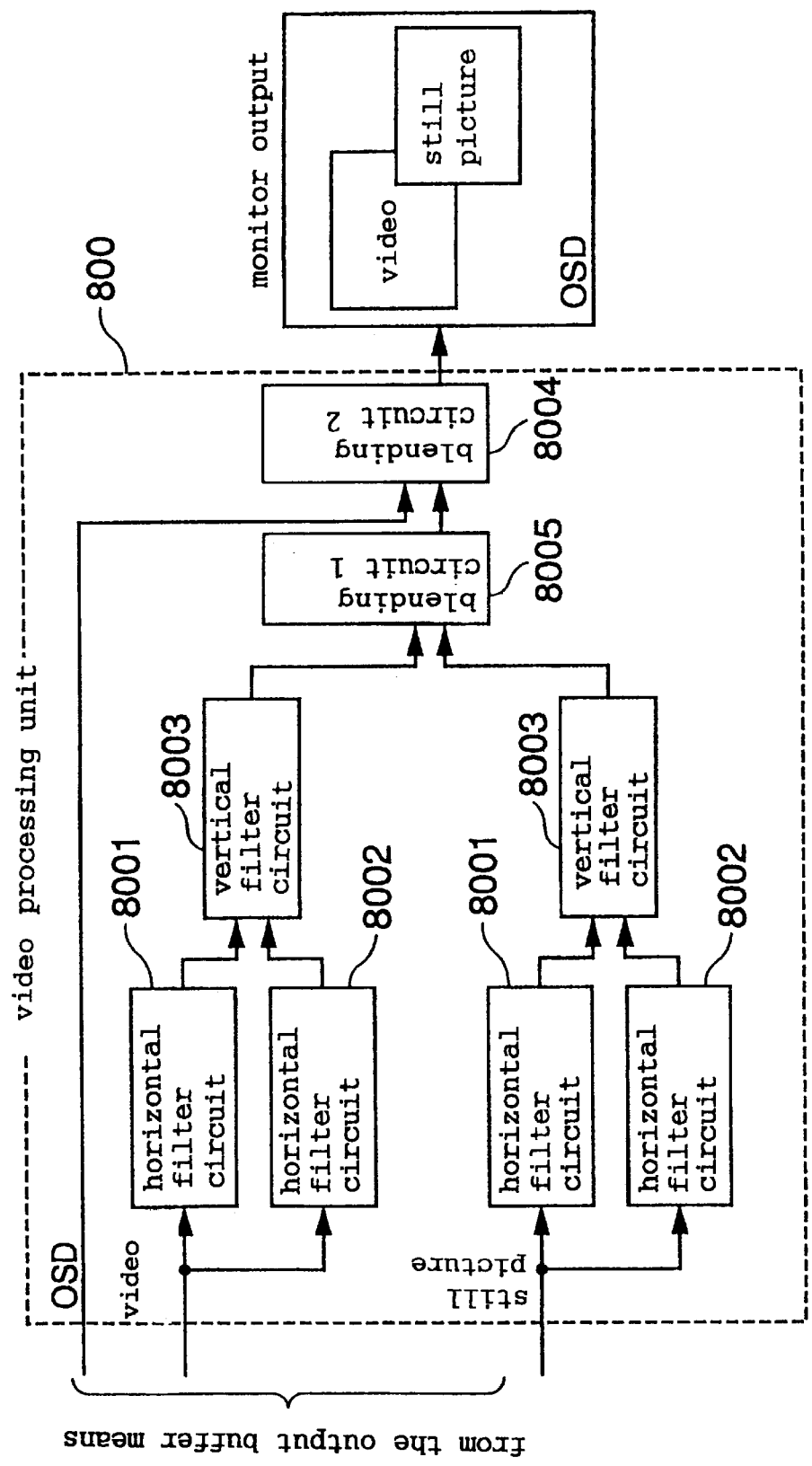
FIG. 17 is a detailed block diagram of another video processing unit in a video display unit according to a prior art.

FIG. 11 shows an example where the video processing is realized in FIG. 17 according to a prior art, where the pixel clock is 13.5 MHz and the operating clock of the video processing unit and instruction sequencer is three times as fast as that, which is 40.5 MHz.

The instruction execution control means 1072 reads out repetitively the instructions on $0^{th}$ to $5^{th}$ address of the instruction memory 1174 with one period of two pixels. At this time, instructions given to the instruction decoder means 1073A and 1073B are staggered as shown in FIG. 11. That is to say, in accordance with the timing of the instruction 1 of the instruction decoder means 1073A, the instruction 4 is given to the instruction decoder means 1073B.

Those two instruction decoder means 1073A and 1073B control the data selection means 1061 and the arithmetic units A1062 and B 1063 for the corresponding video processing units 106A and 106B, respectively. The instruction control is the same as in the above mentioned forth mode, of which description is omitted.

In FIG. 11, the operational result data is shown in BLD (OSD) of the arithmetic unit B. The operational result data of the video processing units 106A and 106B are found to be produced alternately for each video. Accordingly, the output selection means 110 doesn't need a delay control such as the one used in the forth mode but may be only selected alternately by synchronizing to the pixel clock.

As described above, according to the present mode, one instruction sequencer can control a plurality of video processing units, and a variety of display processing can be realized with a different configuration from that in the forth mode by combining the instructions.

In the present mode, two video processing units are described, but the present invention doesn't limit the number particularly. And in an example of FIG. 11, the configuration is implemented by carrying out a filter operation and a blending operation separately by two arithmetic units, but the present invention doesn't limit the configuration particularly. For example, one arithmetic unit may be used for the implementation, or a plurality of units may also be combined. The arithmetic unit is not limited to the multiplication and addition processes but may be the one which carries out other arithmetic operations.

In the above mentioned mode, the instruction memory is described as having the size of two pixels but it may be provided with a size of a plurality of pixels or for one line.

And in the above mentioned mode, the configuration is described as using a register file which is an operational result buffer means, but it can be realized without having a register file if the instructions are designated so as to use the operational result for every cycle.

The Sixth Embodiment

Figure 12:
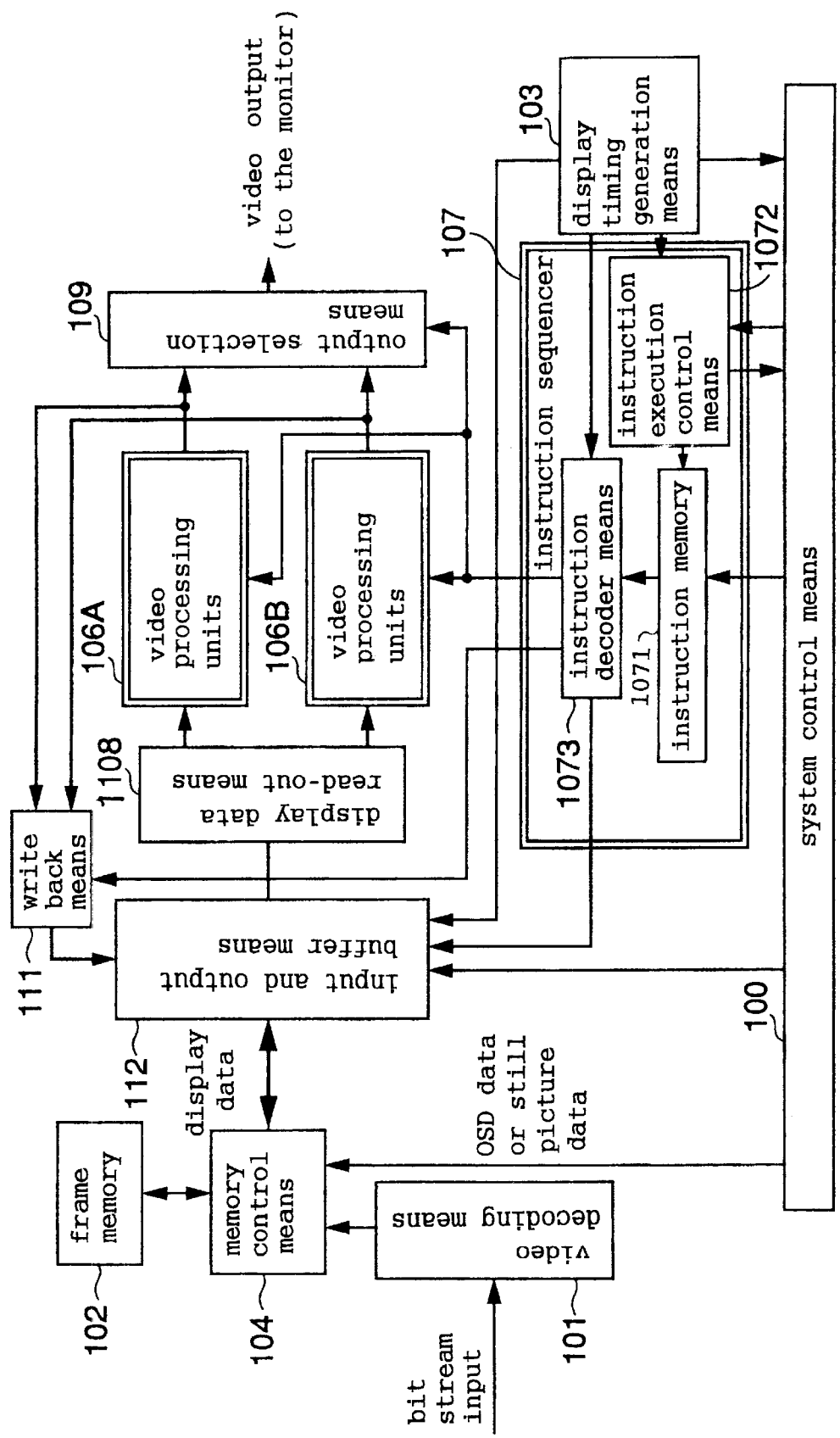
FIG. 12 is a block diagram showing a video display unit according to the sixth embodiment of the present invention.
Figure 13:
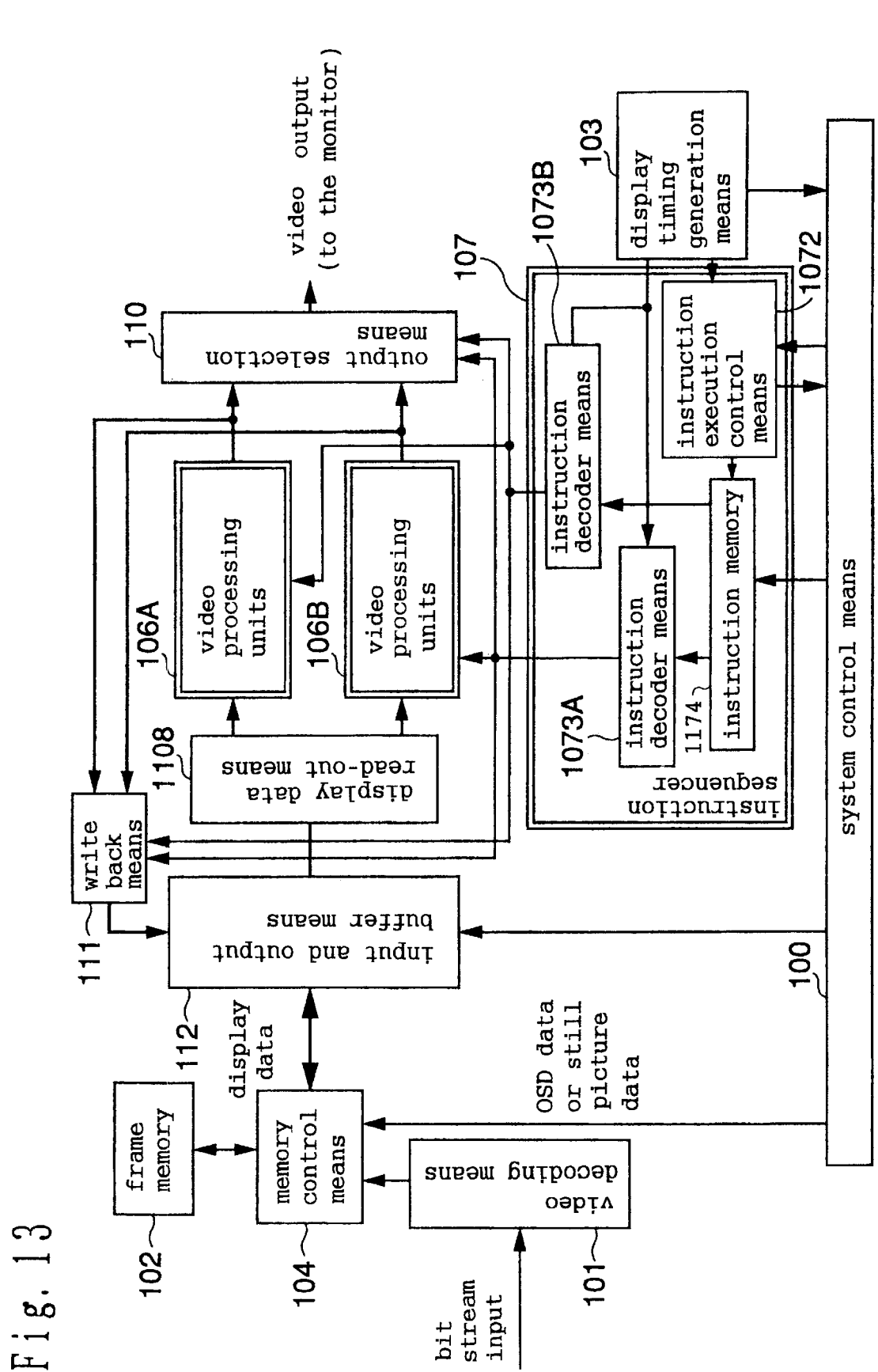
FIG. 13 is another block diagram showing a video display unit according to the sixth embodiment.
Figure 14:
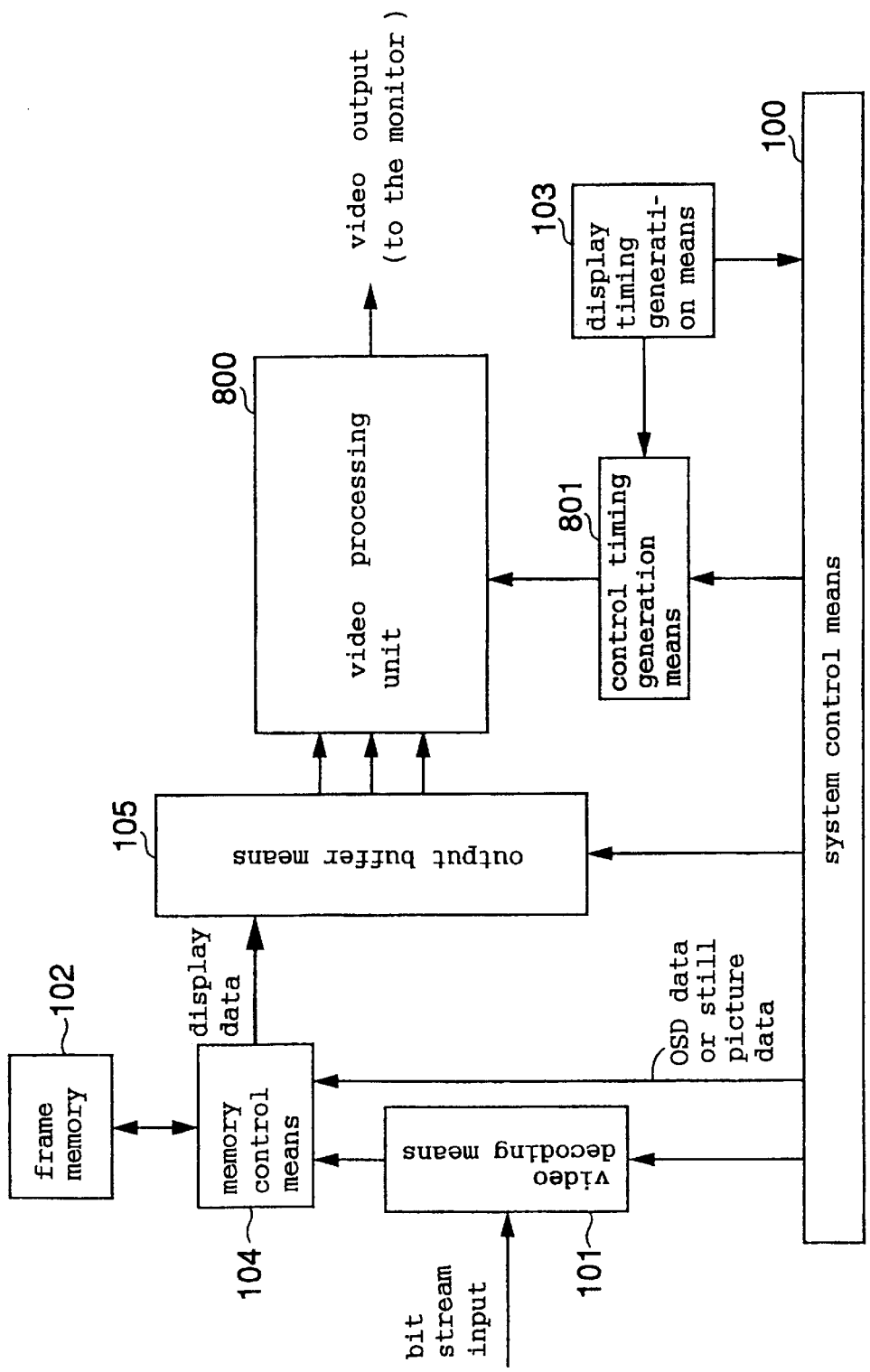
FIG. 14 is a block diagram showing an example of a video display unit according to a prior art.

FIG. 12 is a block diagram showing an example of a video display unit according to the sixth mode of the present invention, and FIG. 13 is a block diagram showing another example in the same way. The same numerals are applied for the same components as in FIGS. 6 and 11, of which descriptions are omitted.

The present mode is an example of a video display unit according to claim 11.

The write back means 111 controls the output data to be written back from the arithmetic units A 1062 and B1063, and the input and output buffer means 112 is equipped with the function of writing the data written back to the write back means 111 into the frame memory 102 in addition to reading out the display data from the frame memory 102.

The instructions of the instruction sequencer 107 select the write back means 111 as an address the operational results are written into and allows the processed decode video or the like to be written into the input and output buffer means 112.

The difference between FIGS. 12 and 13 is the different generation timing of the data outputted from the two video processing units. In FIG. 12, as described in the forth mode, two pixels are generated at the same time for every two pixel clocks. On the other hand, in FIG. 13, as described in the fifth mode, pixels are generated from the two video processing units one by one alternately by sifting the execution instructions by one pixel.

The difference of those examples of configurations doesn't directly relate to the writing operation the present mode is emphasizing on, therefore, the detailed operational descriptions are omitted.

In operation, when the write back means 111 is selected from the instruction decoder means 1073, the output data of the arithmetic units A 1062 or B 1063 are temporarily stored in the write back means 111.

The write back means 111 transfers the stored data to the input and output buffer means 112 in a cycle except to the display read-out. When the operational result data for one line are written in, the system control means 100 controls the writing-in transfer to the frame memory 102 by the memory control means 104.

If the videos written back are displayed by reading out of the frame memory 102 as still pictures, it is possible to display a plurality of reduced decoded videos in arrangement, and the user interface screens can easily be provided, in such a form as reduced still pictures fixed into the program table.

In the present mode, two video processing units are described, but the present invention doesn't limits the number particularly. And in an example of FIG. 7, the configuration is implemented by carrying out a filter operation and a blending operation separately by the two arithmetic units, but the present invention doesn't limit the configuration particularly. For example, it can be implemented with one arithmetic unit, or a plurality of arithmetic units may be combined. The arithmetic units are not limited only to the multiplication and addition processes but may be the ones carrying out other operational processes.

In the above mentioned mode, the instruction memory is described as having a size of two pixels but it may be provided with a plurality of pixels or one line of pixels.

In the above mentioned mode, the configuration is described as having a register file which is an operational result buffer means, but if these instructions are designated so as to use the operational result for each cycle, it can be implemented without having a register file.

In either unit of the video display units described in the present specification, each component can be implemented by means of software or it can be constructed as a dedicated hard ware.

The entire or part of functions of each means or each step described in either unit of the video display units described in the present specification may be implemented by computer program recorded in a magnetic disc, an optical disc or other recording media, which can be formed and can be utilized, needless to say, in order to implement the same operations as described above. That is to say, the present invention could be a program recording medium storing a program to implement by computer the entire or part of functions of each means or of each part in the above mentioned units.

As the above description discloses, the present invention can control the increase of the development cost and can provide a video display unit with an excellent expansion possibility. That is to say, according to a video display unit of the present invention, for different specifications with display requirements depending on the service providers, each of the functions can be implemented easily by combining common hardware and instructions corresponding to each of the specification with display requirements. And it is also possible to implement that with only a little size of the instruction memory.

And in case the video resolution is increased such as for a high definition (the resolution exceeds 720 pixels×480 lines) system, a video processing unit with a similar characteristic can be easily implemented by increasing the number of video processing units operating in parallel.

In addition, thereby, the effects are gained that the development cost which used to be a problem due to the necessity of manufacturing different types of circuits (LSI) for each required specification can be reduced.

Availability in the Industry

As described above, according to the present invention, multipurpose arithmetic units for carrying out at least one operation within one period of the pixel clock and for generating a display data, and an instruction sequencer for describing the display data and the operational contents to be inputted to this as instructions, for example, are provided and by implementing the described instructions while synchronizing to the display clock, video up/down scaling processes as well as the blending process with the OSD can be realized. Thereby, it is not necessary to provide a dedicated circuit for each required specification such as in a conventional unit, and by rewriting the instructions within the instruction sequencer, it is possible to cope with a plurality of display specifications.

What is claimed is:

1. A video display unit comprising:
   a frame memory storing display data;
   a display timing generation means for generating a display timing;
   a memory control means for reading out display data from said frame memory by synchronizing to said display timing generation means;
   an output buffer means for temporarily storing display data read out by said memory control means;
   an arithmetic unit for generating display data by carrying out at least one operation within one period of a pixel clock;

a data selection means for reading out display data from said output buffer means by synchronizing to the pixel clock and for selection data inputted to said arithmetic unit; and an instruction sequencer for controlling said data selection means and said arithmetic unit by synchronizing to the timing of said display timing generation means, said instruction sequencer having:

an instruction memory for storing control information to control said arithmetic unit and said data selection means;

an instruction execution control means for reading out at least one or more instructions within one period of the pixel clock; and an instruction decoder means for decoding said read out instructions and for controlling data inputted to said arithmetic unit by said data selection means.

2. A video display unit according to claim 1 characterized by:

said instruction memory storing execution instruction within at least one period of the pixel clock; and said instruction execution means reading out repetitively said instruction memory by synchronizing to the pixel clock.

3. A video display unit according to claims 1 or 2 characterized by having an operational result buffer means for enabling to temporarily memorize outputs of said arithmetic unit and for enabling to output to said data selection means.

4. A video display unit according to either one of claims 1 to 2 characterized by having a write back means for writing back data outputs from said arithmetic unit to said output buffer means and the instruction sequencer controlling said write back means.

5. A video display unit according to either one of claims 1 or 2 characterized by said instruction sequencer being provided with a switching means for the number of instructions read out within one period of the pixel clock.

6. A video display unit comprising:

a memory frame for storing display data;

a display timing generation means for generating a display timing;

a memory control means for reading out display data from said frame memory by synchronizing to the generated display timing;

an output buffer means for temporarily storing display data read out by the memory control means;

a display data read out means for controlling reading out of display data from said output buffer means in accordance with a desired display specification;

a plurality of video processing units for processing display data read out from said display data reading out means;

an output selection means for selecting output data of said plurality of video processing units; and an instruction sequencer for controlling said plurality of video processing units and said output selection means by utilizing processing instructions corresponding to a desired display specification within processing instructions corresponding to a plurality of display specifications stored in advance, wherein each of said video processing units includes an arithmetic unit for carrying out at least one operation within one period of a pixel clock and for generating display data, and a data selection means for reading out display data by synchronizing to the pixel clock from said output buffer means and for selecting data to be inputted to said arithmetic unit; and said instruction sequencer includes an instruction memory storing control information for controlling said arithmetic unit and said data selection means, an instruction execution control means for reading out at least one or more instructions within one period of the pixel clock, and an instruction decoder means for controlling data inputted to an arithmetic unit within said plurality of video processing units by decoding the read out instructions.

7. A video display unit comprising:

a memory frame for storing display data;

a display timing generation means for generating a display timing;

a memory control means for reading out display data from said frame memory by synchronizing to the generated display timing;

an output buffer means for temporarily storing display data read out by the memory control means;

a display data read out means for controlling reading out of display data from said output buffer means in accordance with a desired display specification;

a plurality of video processing units for processing display data read out from said display data reading out means;

an output selection means for selecting output data of said plurality of video processing units; and an instruction sequencer for controlling said plurality of video processing units and said output selection means by utilizing processing instructions corresponding to a desired display specification within processing instructions corresponding to a plurality of display specifications stored in advance, wherein each of said video processing units includes an arithmetic unit for carrying out at least one operation within one period of a pixel clock and for generating display data, and a data selection means for reading out display data from said output buffer means by synchronizing to the pixel clock and for selecting data to be inputted to said arithmetic unit; and said instruction sequencer includes an instruction memory storing control information for controlling said arithmetic unit and said data selection means, an instruction execution control means for reading out at least one or more instructions within one period of the pixel clock, and an instruction decoder means provided in each of said plurality of video processing units and for controlling data inputted to an arithmetic unit within the video processing units by decoding said read out instructions.

8. A video display unit according to claims 6 or 7 characterized by said instruction memory storing execution instructions within at least one period of the pixel clock, and said instruction execution control means reading out said instruction memory repetitively by synchronizing to the pixel clock.

9. A video display unit according to either one of claims 6 to 7 characterized by each of said video processing units having an operational result buffer means for enabling to temporarily memorize outputs of said arithmetic unit and for enabling to output to said data selection means.

10. A video display unit according to either one of claims 6 to 7 characterized by having a write back means for writing back output data from each of said video processing units to said output buffer means and said instruction sequencer controlling said write back means.

11. A program recording medium characterized by storing a program for implementing by computer the entire or a part of functions of each means according to any one of claims 1, 2, 3, 4, 5, 6, or 7.

* * * * *